(12) United States Patent
Ha et al.

(10) Patent No.: US 11,151,799 B2
(45) Date of Patent: Oct. 19, 2021

(54) SYSTEM AND METHOD FOR MONITORING FIELD BASED AUGMENTED REALITY USING DIGITAL TWIN

(71) Applicant: VIRNECT inc., Naju-si (KR)

(72) Inventors: Tae Jin Ha, Gimpo-si (KR); Chul Hee Lee, Incheon (KR); Soo Hwan Kim, Seoul (KR); Sung Ha Lee, Incheon (KR); Hye Jeong Nam, Yongin-si (KR); Ho Young Kim, Seoul (KR)

(73) Assignee: VIRNECT INC., Naju-si (KR)

( * ) Notice: Subject to any disclaimer, the term of this patent is extended or adjusted under 35 U.S.C. 154(b) by 0 days.

(21) Appl. No.: 17/105,238

(22) Filed: Nov. 25, 2020

(65) Prior Publication Data

US 2021/0201584 A1     Jul. 1, 2021

(30) Foreign Application Priority Data

Dec. 31, 2019  (KR) .................. 10-2019-0179249

(51) Int. Cl.
  *G06T 19/00*   (2011.01)
  *G06T 17/00*   (2006.01)
  *G06K 9/00*    (2006.01)

(52) U.S. Cl.
  CPC ........ *G06T 19/006* (2013.01); *G06K 9/00671* (2013.01); *G06T 17/00* (2013.01)

(58) Field of Classification Search
  CPC ......... G06T 15/00; G06T 17/00; G06T 19/00; G06T 19/003; G06T 19/006; G06F 3/011; G06F 2111/18; G06K 9/00671

USPC ......................................... 345/633
See application file for complete search history.

(56) References Cited

U.S. PATENT DOCUMENTS

| | | | | |
|---|---|---|---|---|
| 8,542,906 | B1* | 9/2013 | Persson | G06Q 10/06 382/154 |
| 2001/0044725 | A1* | 11/2001 | Matsuda | G10L 19/00 704/269 |
| 2016/0184703 | A1* | 6/2016 | Brav | A63F 13/5378 463/30 |
| 2017/0061631 | A1* | 3/2017 | Karasudani | G06F 3/017 |
| 2018/0095616 | A1* | 4/2018 | Valdivia | G06F 3/013 |
| 2019/0130648 | A1* | 5/2019 | Duca | H04L 67/00 |
| 2019/0196457 | A1* | 6/2019 | Krautwurm | B25J 9/1676 |
| 2019/0206141 | A1* | 7/2019 | Deng | G06K 9/00671 |
| 2019/0217198 | A1* | 7/2019 | Clark | A63F 13/54 |
| 2019/0228583 | A1* | 7/2019 | Lai | G06F 3/012 |
| 2020/0160607 | A1* | 5/2020 | Kjallstrom | G06F 3/017 |
| 2020/0234502 | A1* | 7/2020 | Anderlecht | H04L 51/32 |

* cited by examiner

*Primary Examiner* — James A Thompson
(74) *Attorney, Agent, or Firm* — STIP Law Group, LLC

(57) ABSTRACT

Provided is a method for monitoring a field based on augmented reality using a digital twin performed in a processor of a computing device of a manager located remotely from a physical space of a field, including: outputting a field twin model of a three-dimensional virtual space matched to the physical space of the field; acquiring location information of a field user for the physical space based on positioning sensor data received from a field sensor system arranged in the field; and displaying a first virtual content representing a location of the field user on the field twin model by matching location information of the field user for the physical space to the three-dimensional virtual space.

6 Claims, 16 Drawing Sheets

[FIG. 1]
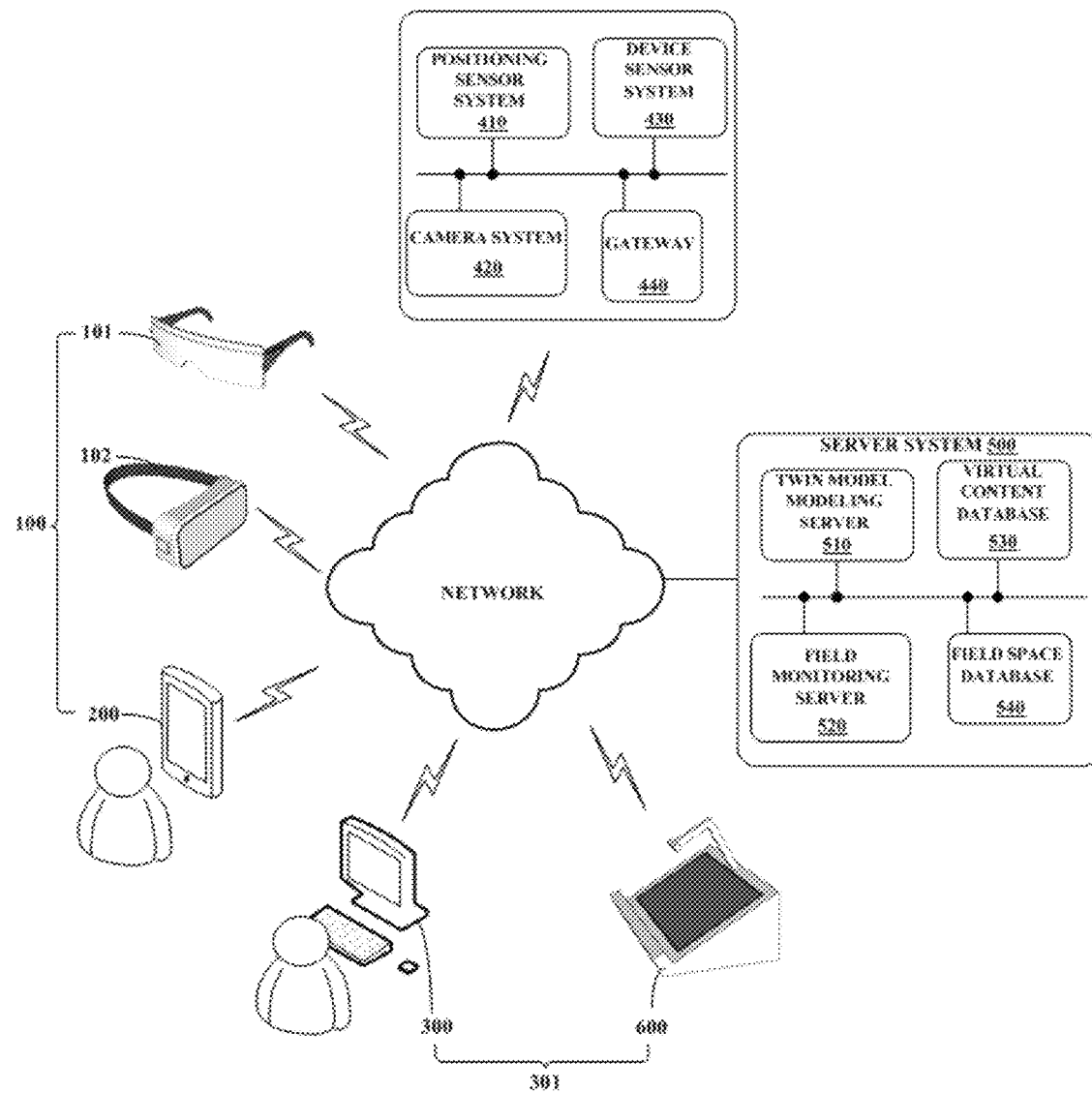

[FIG. 2]
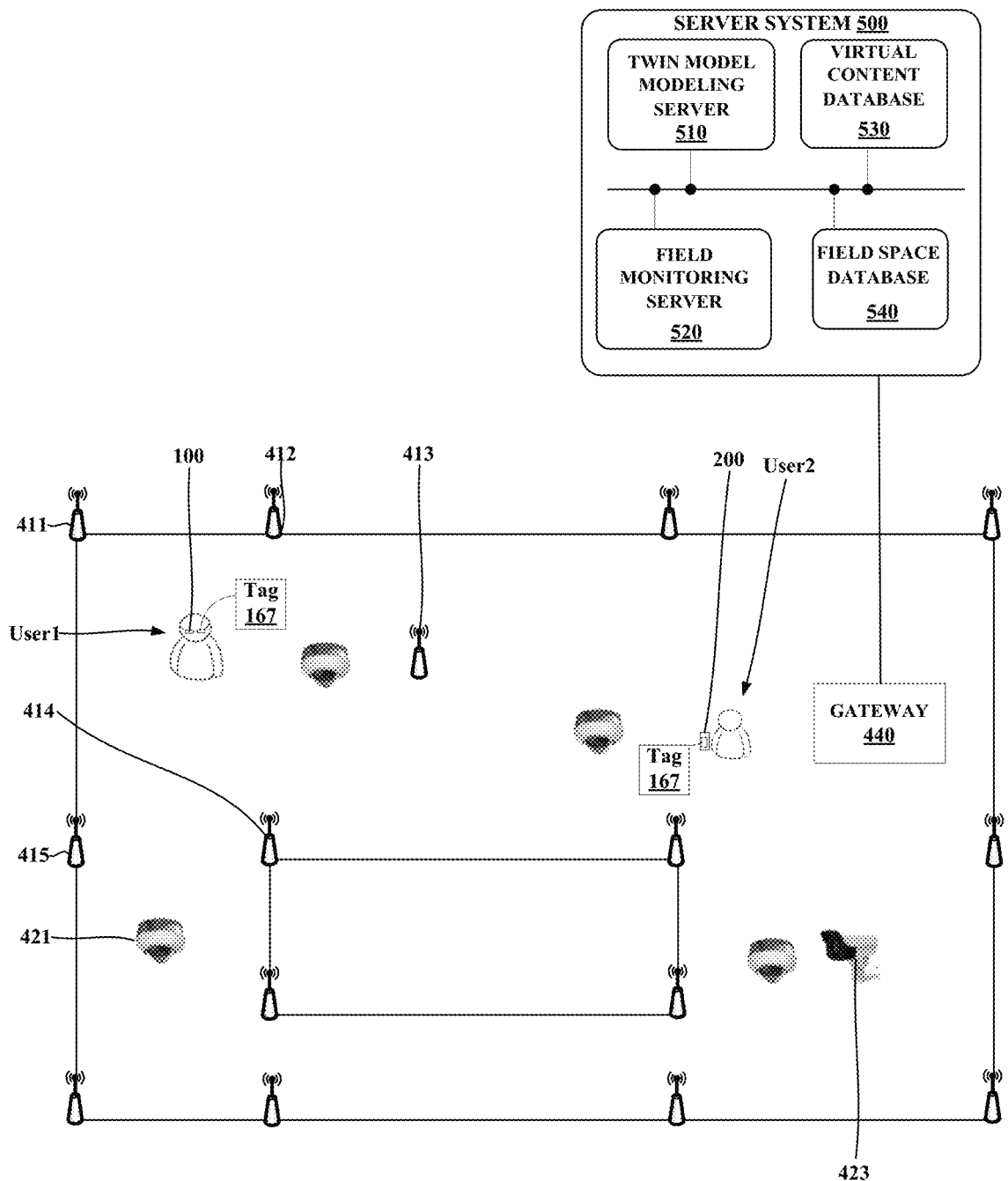

[FIG. 3]
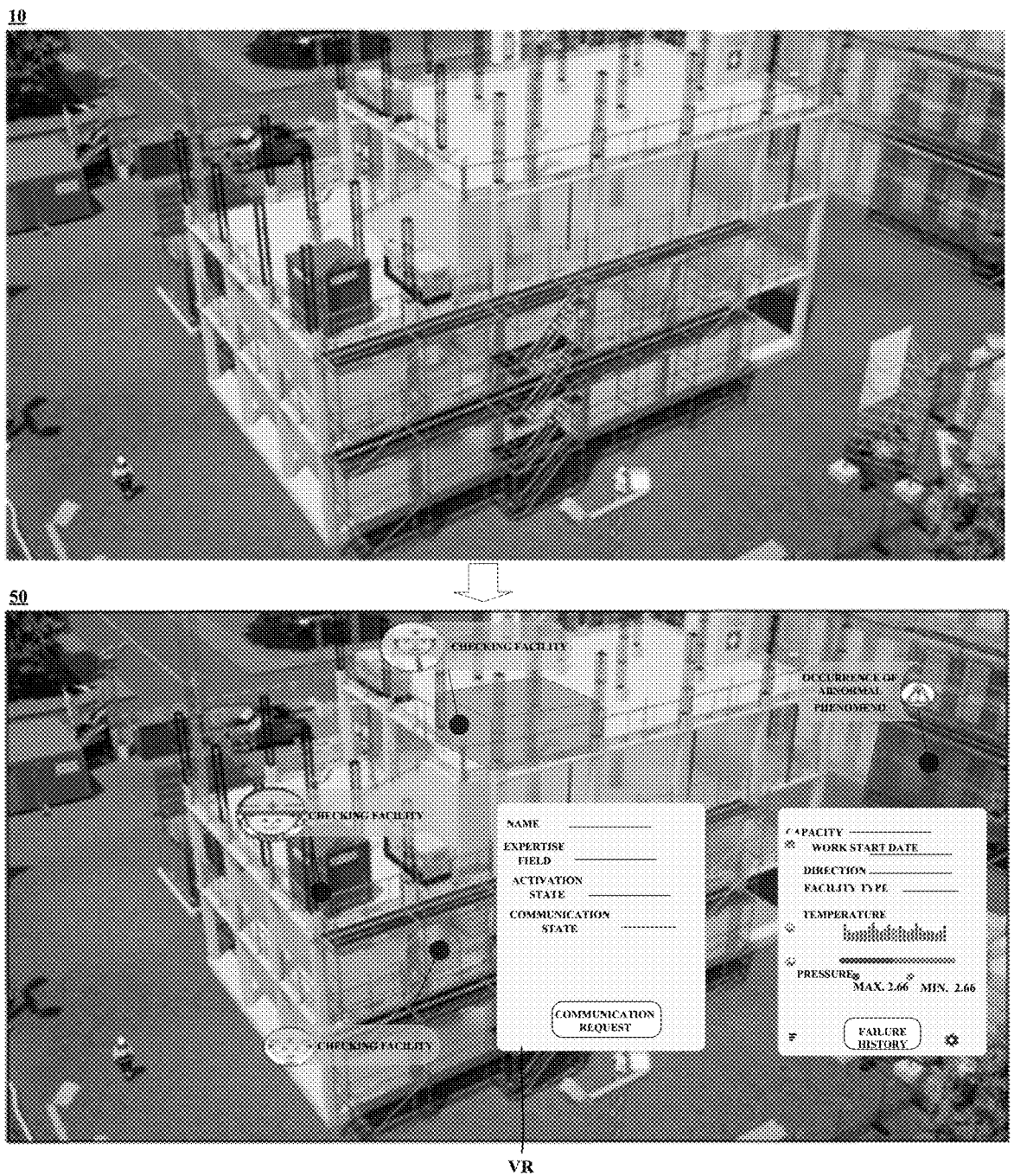

[FIG. 4]
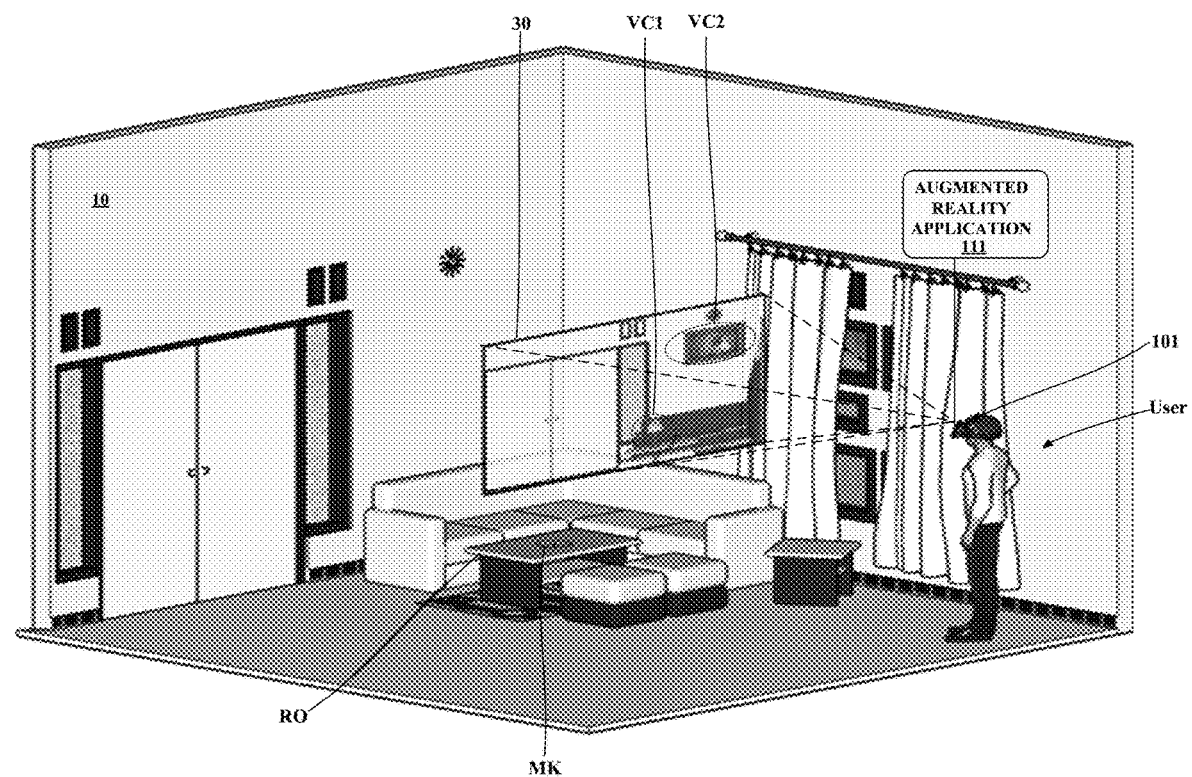

[FIG. 5]
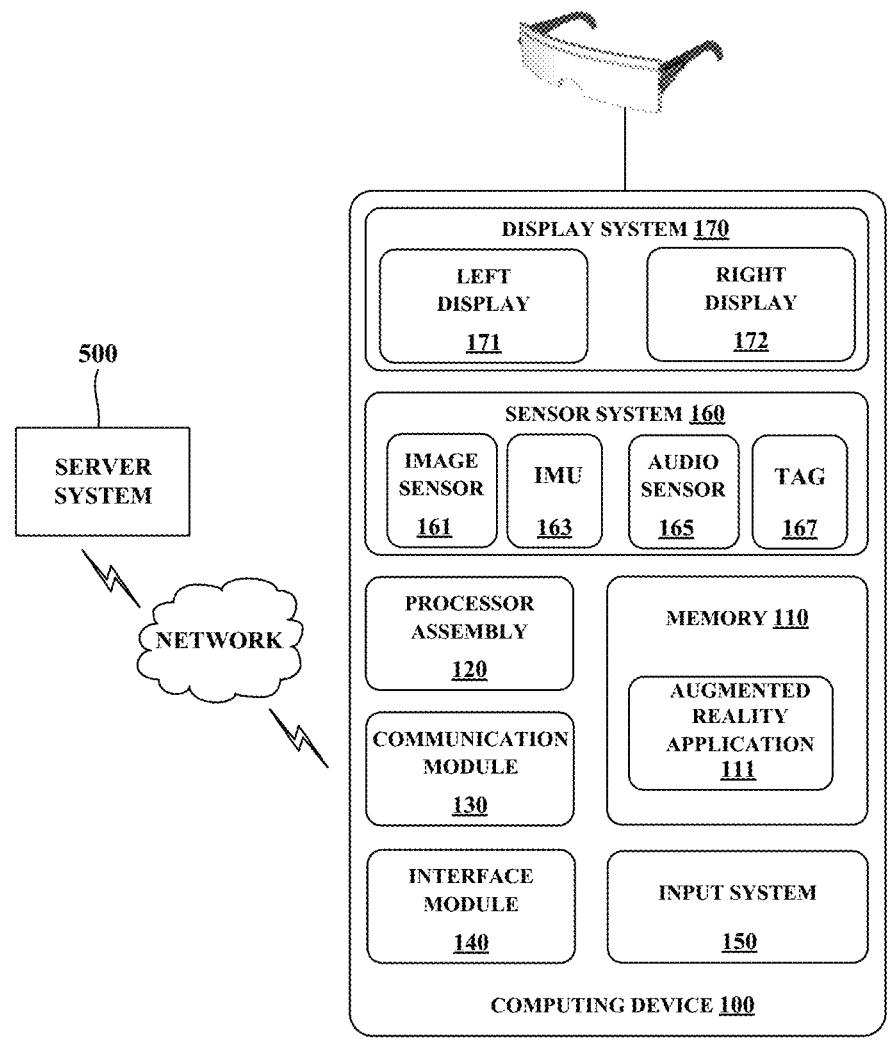

[FIG. 6]
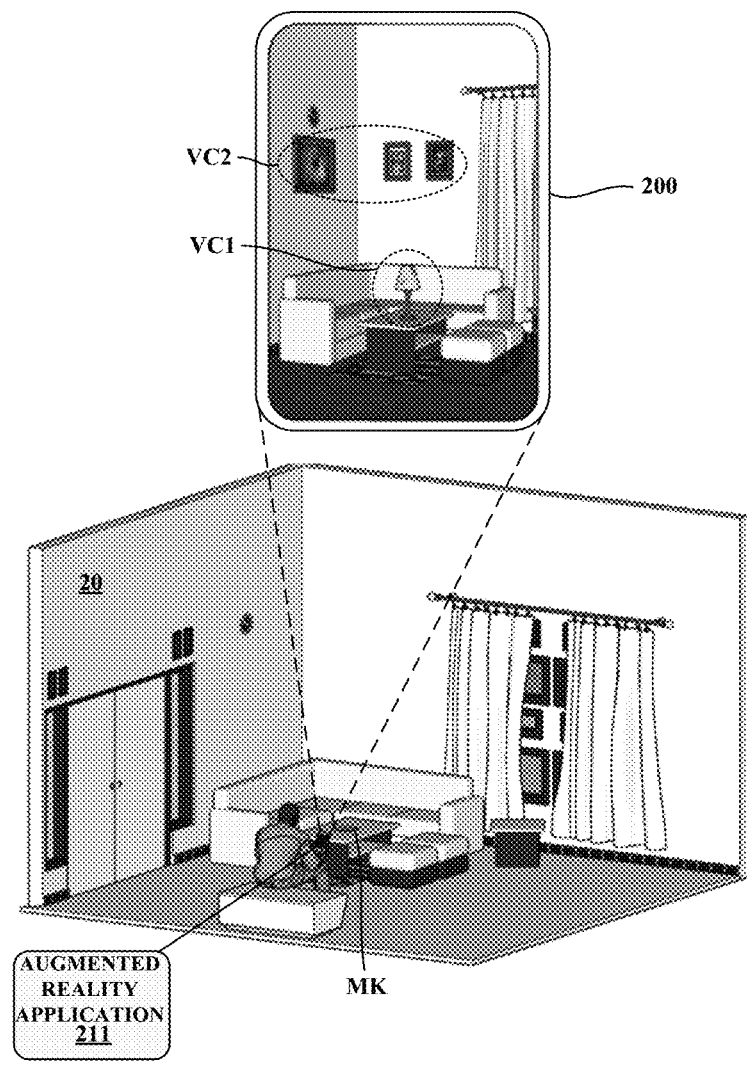

[FIG. 7]
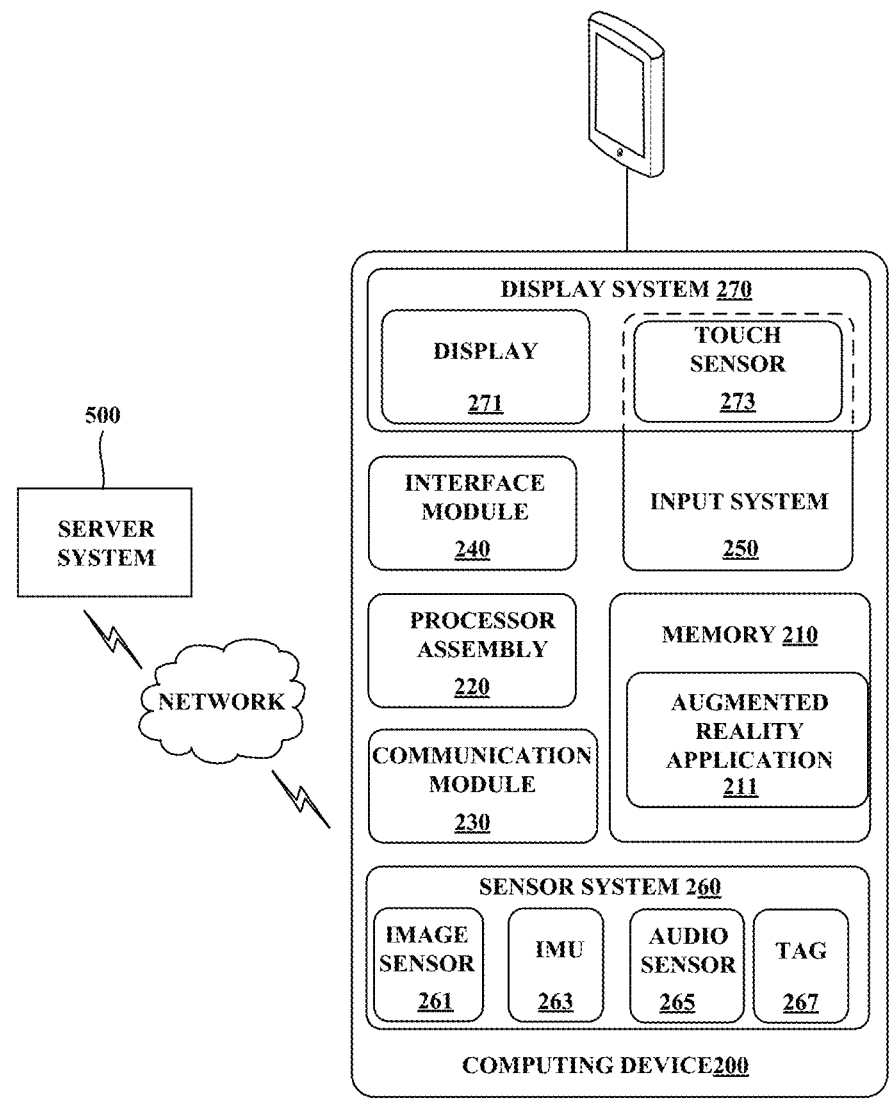

[FIG. 8]
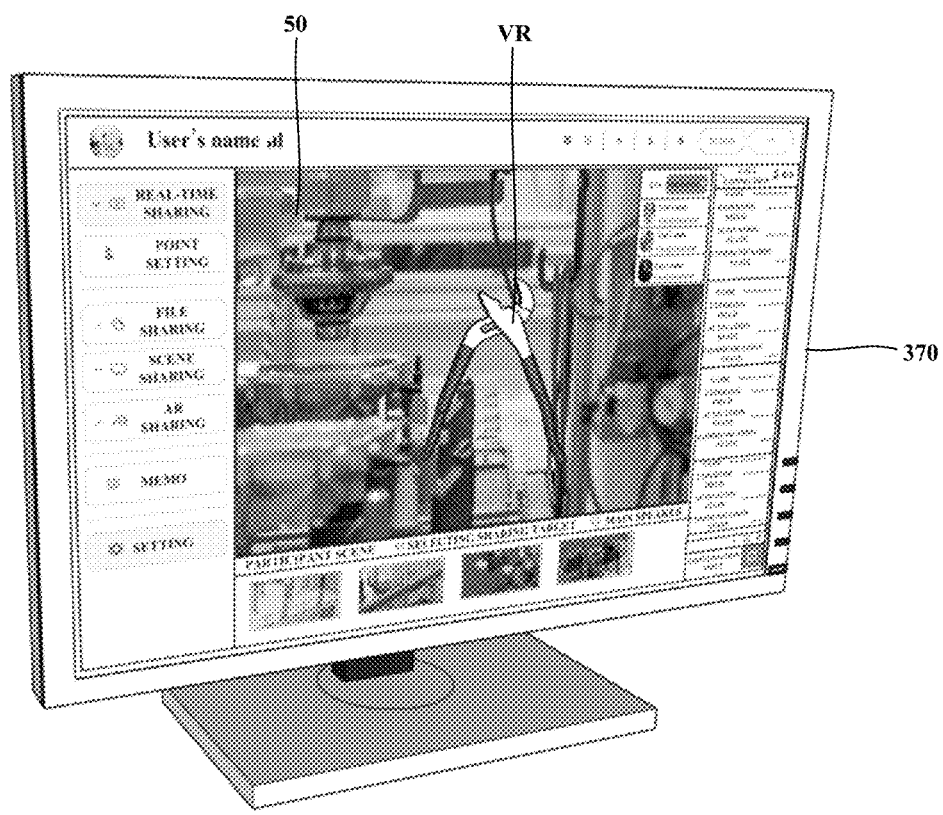

[FIG. 9]
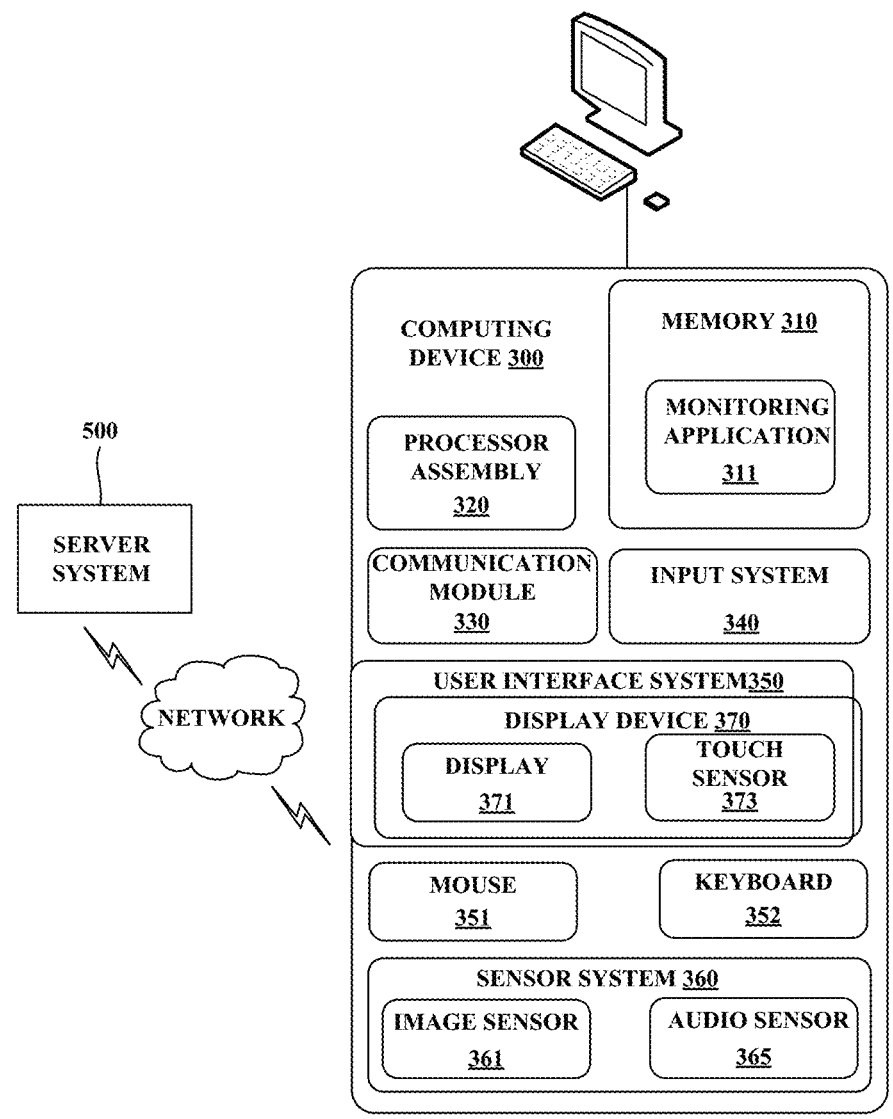

[FIG. 10]
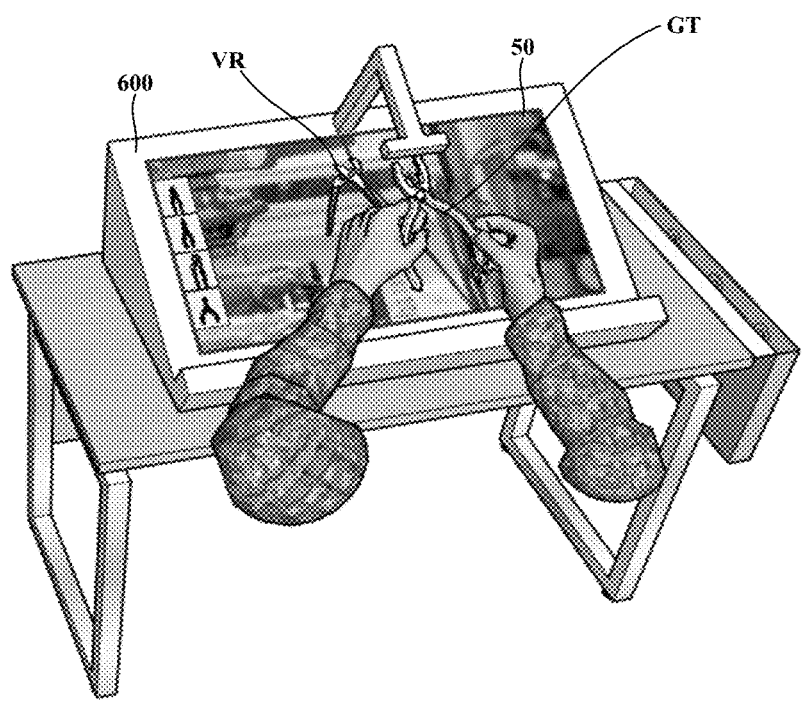

[FIG. 11]
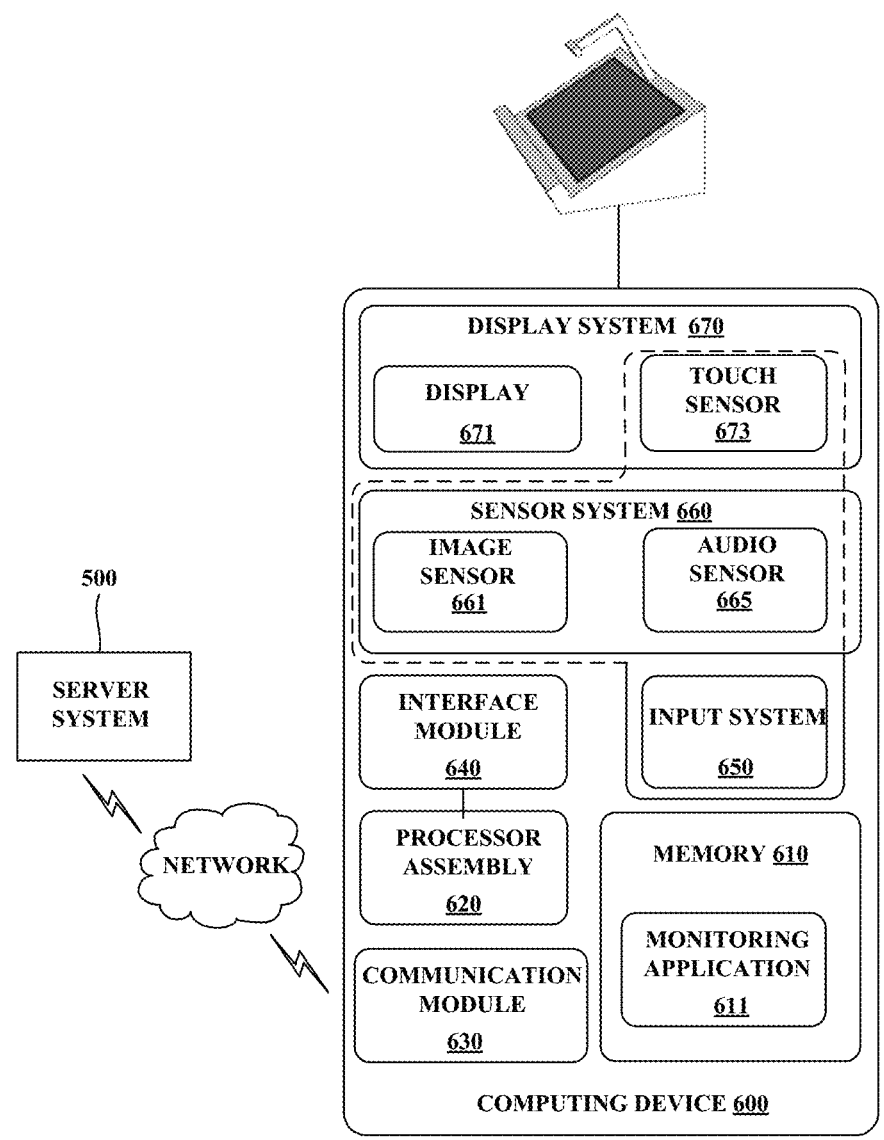

[FIG. 12]
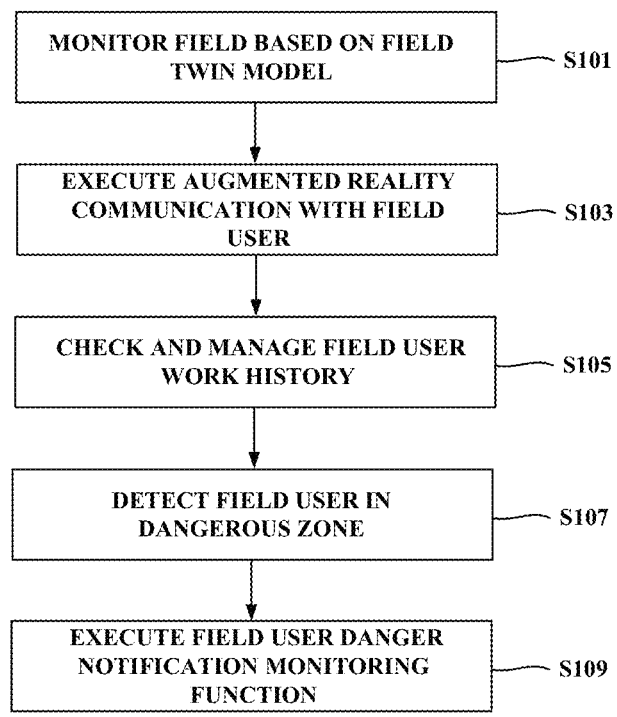

[FIG. 13]
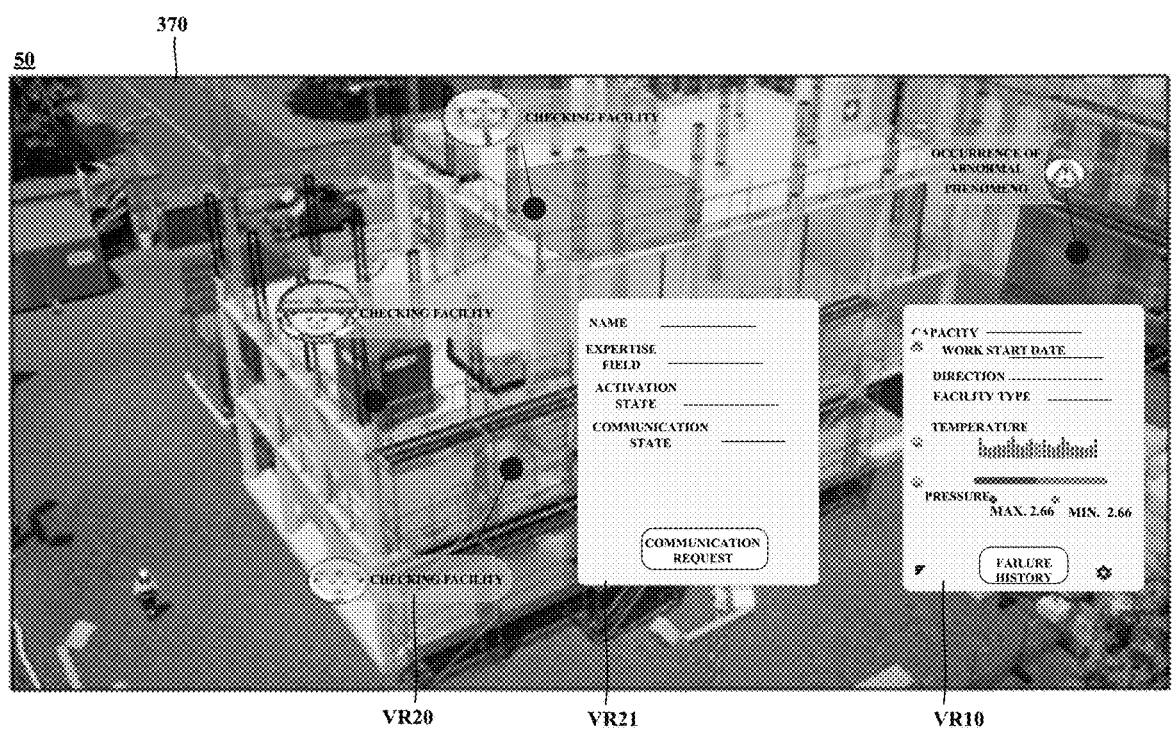

[FIG. 14]
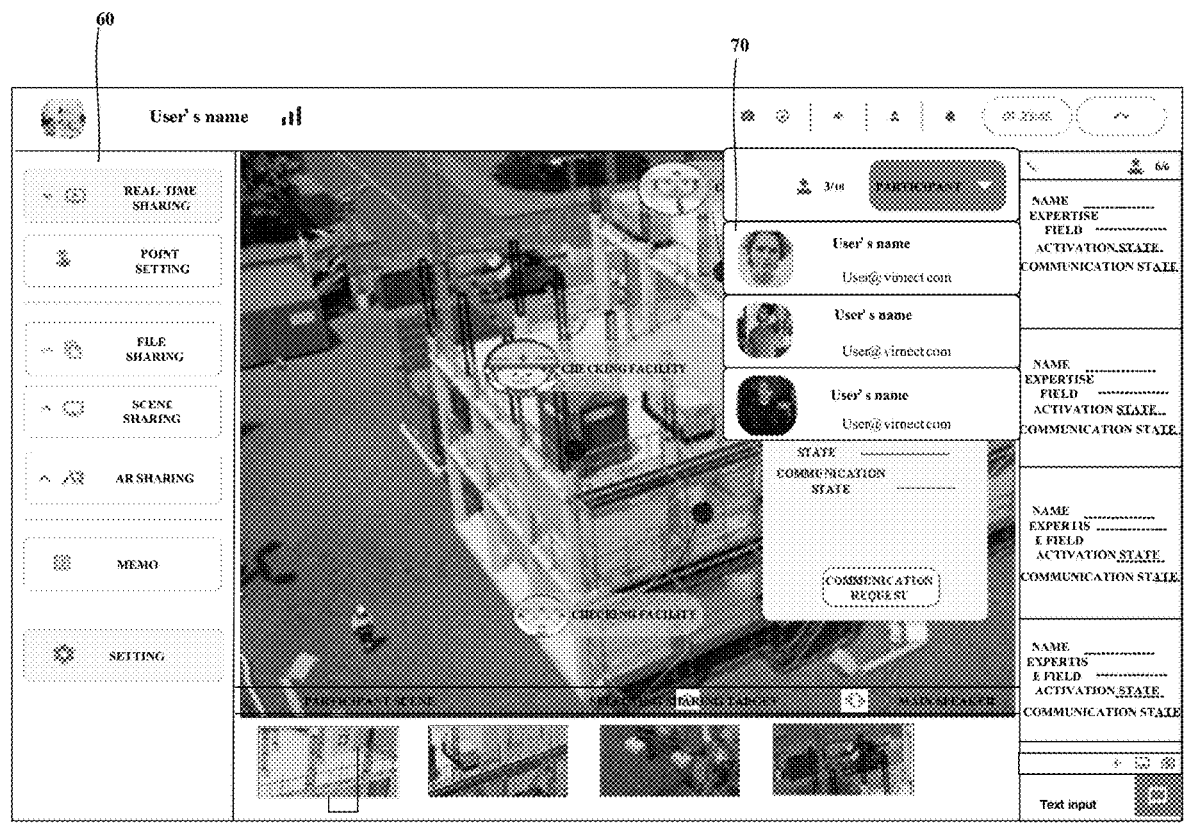

[FIG. 15]
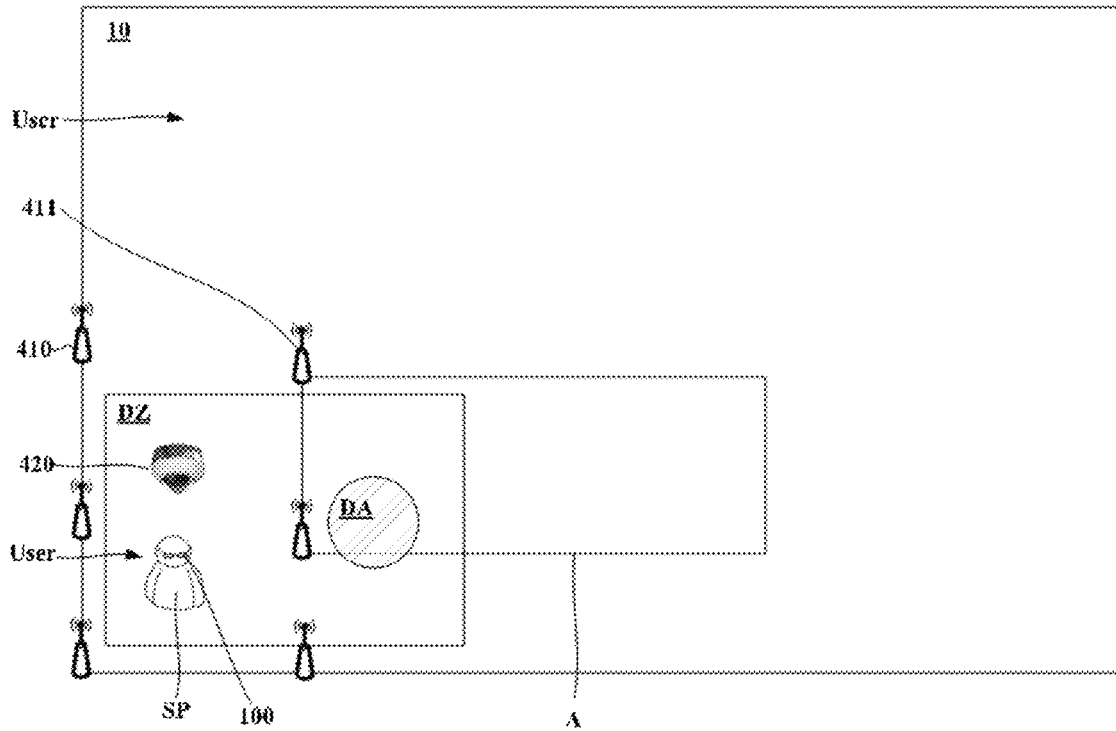
[FIG. 16]
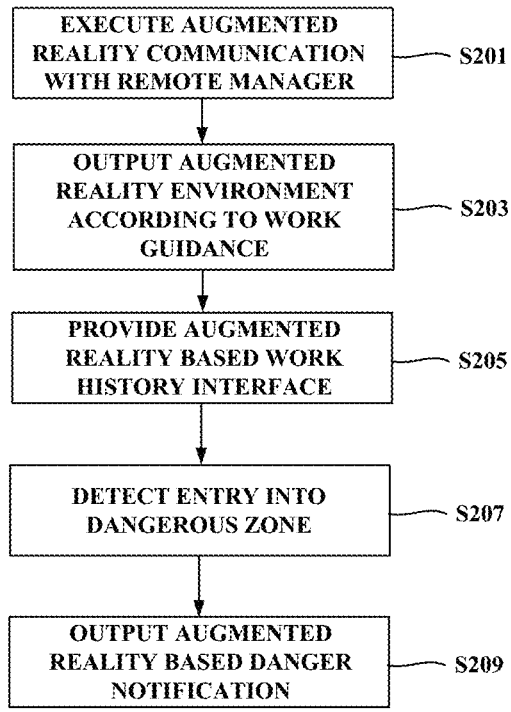

[FIG. 17]
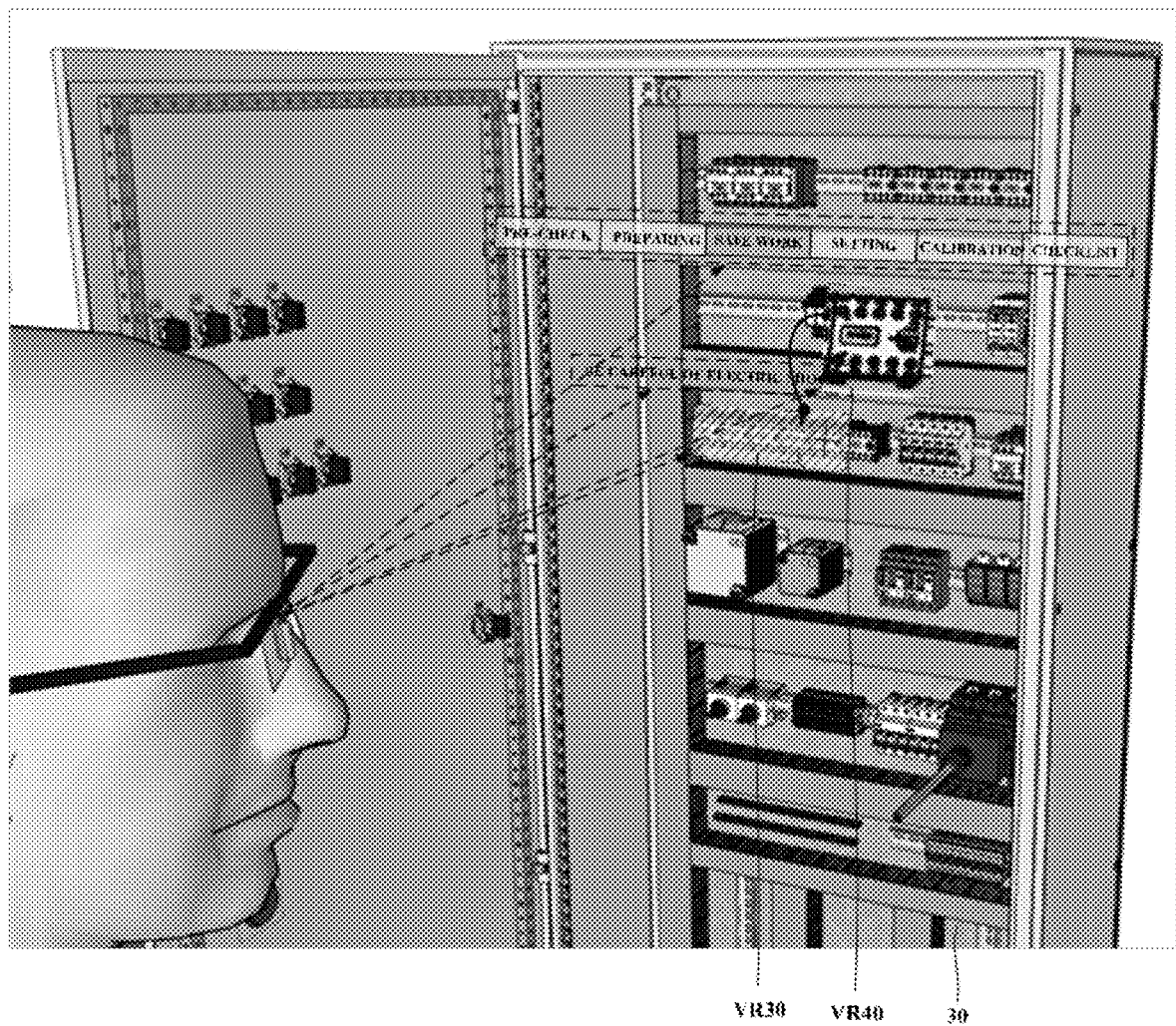

SYSTEM AND METHOD FOR MONITORING FIELD BASED AUGMENTED REALITY USING DIGITAL TWIN

CROSS-REFERENCE TO RELATED APPLICATIONS

This application claims the priority of the Korean Patent Applications NO 10-2019-0179249 filed on Dec. 31, 2019 in the Korean Intellectual Property Office, the disclosure of which is incorporated herein by reference."

BACKGROUND OF THE DISCLOSURE

Field of the Disclosure

The present disclosure relates to a system and a method for monitoring a field based on augmented reality using a digital twin. More particularly, the present disclosure relates to a technology that implements a work field by a digital twin and then monitors a field based on the implemented digital twin and supports work to field workers.

Related Art

Recently, while interest in Virtual Reality (VR), Augmented Reality (AR), and Mixed Reality (MR) is rapidly increasing, and the market of services and devices that provide immersive experiences of users is developing day by day by adding even eXtended Reality (XR).

Here, the extended reality (XR) is a term that encompasses both virtual reality, augmented reality, and mixed reality technology, and the concept through the process of fusion to a new type of device that can support both the augmented reality, the virtual reality, and the mixed reality is born.

Extended reality (XR) technology is jointly using many element technologies based on VR, AR, and MR, and is being applied to innovative and new types of devices where the technologies can be used, enabling various new experiences. For example, the extended reality (XR) technology has been applied to various industries ranging from manufacturing, architecture, games, video, medical, education, shopping, marketing, tourism, automobiles, and healthcare.

On the other hand, in a situation where the digitalization of the manufacturing process is increasing more and more, the concept of a digital twin that creates a digital image of a real object or process in near real time for a work field is drawing attention. The digital twin enables retaining a digital footstep across products from design and development to the end of the product lifecycle. Using this, in not only the product itself as designed, but also the system that manufactures the product, how the product is used in the field.

The digital twin is defined as an evolving digital profile that records past and present activity of a physical object or process that helps optimize business performance. The digital twin is based on large, accumulated real-time, real-world data measurement values across multiple dimensions. Based on the measurement values, companies can create evolving digital profiles of objects or processes to gain insights into system performance or perform physical responses such as changes in product design or manufacturing processes.

The real power and importance of the digital twin lies in providing a near real-time, comprehensive connection between the physical and digital worlds. This enables fundamental design and process changes that are not possible with conventional methods.

Therefore, if using a digital twin that virtually modeled a physical space of the work field and an augmented reality environment (or mixed reality environment) that augmented the virtual contents of the physical space, a remote manager can more accurately monitor the work field and give work instructions, and field workers will be able to establish an efficient environment where the field workers can receive accurate work orders and receive required work information from a remote manager.

SUMMARY OF THE DISCLOSURE

The present disclosure provides a system and a method for monitoring a field situation and a work status of a worker through a digital twin from various viewpoints by a remote manager, and providing a work instruction and a work guide based on an augmented reality environment.

The present disclosure also provides enabling a remote manager monitoring a field situation and a work status by a digital twin to perform an efficient work instruction or work guide in an augmented reality environment, to a field worker.

The present disclosure also provides an alarm based on a digital twin and an augmented reality/mixed reality environment in various methods to enhance stability to a work when a field worker enters a real dangerous zone of the physical space.

In an aspect, provided is a method for monitoring a field based on augmented reality using a digital twin performed in a processor of a computing device of a manager located remotely from a physical space of a field, including: outputting a field twin model of a three-dimensional virtual space matched to the physical space of the field; acquiring location information of a field user for the physical space based on positioning sensor data received from a field sensor system arranged in the field; and displaying a first virtual content representing a location of the field user on the field twin model by matching location information of the field user for the physical space to the three-dimensional virtual space.

In this case, the method may further include: acquiring the location information of the field user for the physical space based on the positioning sensor data received from the field sensor system arranged in the field; acquiring the positioning sensor data acquired by receiving a UWB radio signal generated from a tag of the field user by a plurality anchors; tracking real-time actual coordinates of the physical space for the field user based on the acquired positioning sensor data; calculating virtual coordinates of the three-dimensional virtual space matched to the actual coordinates; and displaying the first virtual content representing identification information of the field user on the calculated virtual coordinates.

Furthermore, the method may further include: receiving information on a real object arranged in the physical space of the field from the field sensor system arranged in the field; and overlaying and displaying the received information on the real object on a virtual object matched to the real object of the field twin model.

Furthermore, the method may further include: requesting augmented reality communication connection with the computing device of the field user through the first virtual content; performing augmented reality communication with the computing device of the field user according to acceptance of the field user; and providing an input/output interface for generating a particular virtual content matched to one location of the three-dimensional-virtual space based on the field twin model and transmitting the generated virtual content as communication data.

Furthermore, the method may further include: receiving work history information matched to the real object through the computing device of the field user; matching and storing the received work history information to the virtual object corresponding to the real object; and displaying a virtual content representing the work history information around the virtual object of the field twin model.

Furthermore, the method may further include: detecting that the field user enters a real dangerous zone of the physical space corresponding to a predetermined dangerous zone of the field twin model; and monitoring the field user in the real dangerous zone by the field twin model and a field image received through a camera system arranged in the field.

Furthermore, the method may further include: transmitting, to the computing device of the field user, coordinates of the three-dimensional virtual space for the predetermined dangerous zone in the field twin model; and overlaying and displaying a virtual content for highlighting a dangerous area on actual coordinates of the physical space matched to coordinate information of the three-dimensional virtual space in the computing device of the field user.

BRIEF DESCRIPTION OF THE DRAWINGS

FIG. 1 illustrates an example of a conceptual view of a system for monitoring a field based on augmented reality using a digital twin according to an embodiment of the present disclosure.

FIG. 2 illustrates an example of a concept for describing a field sensor system installed in a physical space of a field according to an embodiment of the present disclosure.

FIG. 3 illustrates an example of a concept for describing a field twin model according to an embodiment of the present disclosure.

FIG. 4 illustrates an example of experiencing an augmented reality environment through a wearable type computing device according to an embodiment of the present disclosure.

FIG. 5 illustrates an example of an internal block diagram of a wearable type computing device according to an embodiment of the present disclosure.

FIG. 6 illustrates an example of experiencing an extended reality environment through a mobile type computing device according to an embodiment of the present disclosure.

FIG. 7 illustrates an example of an internal block diagram of a mobile type computing device according to an embodiment of the present disclosure.

FIG. 8 illustrates an example of providing a field twin model through a desktop type computing device according to an embodiment of the present disclosure.

FIG. 9 illustrates an example of an internal block diagram of a desktop type computing device according to an embodiment of the present disclosure.

FIG. 10 illustrates an example of experiencing extended reality communication through a tabletop type computing device according to an embodiment of the present disclosure.

FIG. 11 illustrates an example of an internal block diagram of a tabletop type computing device according to an embodiment of the present disclosure.

FIG. 12 illustrates an example of a flowchart illustrating a method for monitoring a field based on augmented reality using a digital twin according to an embodiment of the present disclosure.

FIG. 13 illustrates an example of a screen for monitoring a field through a field twin model according to an embodiment of the present disclosure.

FIG. 14 illustrates an example of a screen for performing augmented reality environment communication with a field user through a field twin model according to an embodiment of the present disclosure.

FIG. 15 illustrates an example for describing a concept in which a field monitoring system detects a field user located in a dangerous zone according to an embodiment of the present disclosure.

FIG. 16 illustrates an example of a method for assisting a work based on an augmented reality environment to a field user through a field monitoring system according to an embodiment of the present disclosure.

FIG. 17 illustrates an example of a concept of providing a notification of a dangerous zone based on an augmented reality environment to a field user located in a dangerous zone according to an embodiment of the present disclosure.

DESCRIPTION OF EXEMPLARY EMBODIMENTS

The present disclosure may have various modifications and various embodiments and specific embodiments will be illustrated in the drawings and described in detail in the detailed description. Effects and features of the present disclosure, and methods for accomplishing the same will be more clearly understood from exemplary embodiments described in detail below with reference to the accompanying drawings. However, the present disclosure is not limited to embodiments disclosed below but may be implemented in various forms. In the following exemplary embodiment, the terms such as first, second, etc., are not restrictive meanings but are used for distinguishing one component from other components. Further, a singular form may include a plural form if there is no clearly opposite meaning in the context. Further, the terms such as "include" or "have" mean that there is a feature or a component disclosed in the specification and a possibility that one or more other features or components will be added is not pre-excluded. In addition, in the drawing, for convenience of description, sizes of the components may be exaggerated or reduced. For example, each configuration illustrated in the drawings is arbitrarily shown for understanding and ease of description, but the present disclosure is not limited thereto.

Hereinafter, the exemplary embodiments of the present disclosure will be described in detail with reference to the accompanying drawings, in which like reference numerals refer to like or corresponding elements and a duplicated description thereof will be omitted when the exemplary embodiments are described with reference to the drawings.

A system for monitoring a field based on augmented reality using a digital twin may provide a method in which states of real objects and field users in a physical space are reflected and provided onto a field twin model in a virtual 3D space generated by scanning an actual work field in real time, and as a result, a remote manager monitors the field through the field twin model.

Furthermore, the system for monitoring a field based on augmented reality using a digital twin may provide a method which enables the remote manager and the field user in the work field to communicate with each other through augmented reality communication to effectively exchange information related to work.

Here, an augmented reality environment may mean an environment in which virtual contents associated with a physical space around a user or a communication counterpart are inserted and generated, and as a result, information provided to the user is augmented and include a mixed reality in addition to the augmented reality (AR) environment. The virtual contents as virtual contents generated by a computing device include labels, text information, images, drawing objects, and 3D entities, and are augmented/mixed contents generated in response to the physical space or an image acquired by capturing the physical space.

In addition, the augmented reality (AR) communication means an activity (an activity of exchanging the communication data generated according to a user input for mutual communication) in which different users exchange communication data through the computing device based on immersive media (e.g., video, audio) including the virtual contents.

Furthermore, the remote manager means a person who monitors a field situation through the field twin model at a remote location from a field in which the work is performed and provides a work guidance for instructing or assisting the work based on the augmented reality communication to the field user as the virtual contents.

Furthermore, the field user means a person who receives information related to the work based on the augmented reality environment provided through the work guidance received in the work field.

Hereinafter, a detailed configuration constituting the system for monitoring a field based on augmented reality by using a digital twin will be first described in detail.

<System for Monitoring Field Based on Augmented Reality Using Digital Twin>

FIG. 1 illustrates an example of a conceptual view of a system for monitoring a field based on augmented reality using a digital twin according to an embodiment of the present disclosure.

Referring to FIG. 1, a system for monitoring a field based on augmented reality by using a digital twin as an example according to an embodiment of the present disclosure includes field user computing devices 100: 101, 102, and 200, remote manager computing devices 301, 300 and 600, a field sensor system 400, and a server system 500.

Each component of FIG. 1 may be connected through a network. The network refers to a connection structure in which information may be exchanged between nodes such as a field user computing device, a remote manager computing device, the field sensor system 400, and the server system 500, and an example of such a network may include various wired/wireless networks including a 3rd Generation Partnership Project (3GPP) network, a Long Term Evolution (LTE) network, a World Interoperability for Microwave Access (WIMAX) network, Internet, a Local Area Network (LAN), Wireless Local Area Network (LAN), a Wide Area Network (WAN), a Personal Area Network (PAN), a Bluetooth network, an Ultra Wide Band (UWB) network, satellite broadcasting network, an analog broadcasting network, a Digital Multimedia Broadcasting (DMB) network, etc., but is not limited thereto.

Server System 500

The server system 500 may perform a process which models a virtual three-dimensional field twin model based on data obtained by three-dimensional scanning of the physical space in the field and reflects information on the real object or field user in the physical space of the field on the modeled field twin model in real time. At least some of the processes may be performed in the server system 500 and the remaining processes may be performed the computing devices 301: 300 and 600 of the remote manager.

Furthermore, the server system 500 relays augmented reality communication data exchange between the computing devices 301: 300 and 600 of the remote manager and the computing device 100 of the field user to provide mutual augmented reality communication to be performed.

The server system 500 may include a twin model modeling server 510, a field monitoring server 520, a virtual content database 530, and a field space database 540.

In detail, the twin model modeling server 510 may generate the field twin model corresponding to the physical space of the field in a virtual 3D space based on data obtained by 3D scanning the physical space of the field.

For example, the twin model modeling server 510 may generate the field twin model that models the virtual objects corresponding to the real objects of the physical space in the three-dimensional virtual space based on the image obtained by capturing the physical space of the field and spatial information (e.g., depth data) that scans the locations of the real objects located in the physical space.

Furthermore, the twin model modeling server 510 may generate the field twin model while reflecting an in put of the remote manager from the computing devices 301: 300 and 600 of the remote manager.

The field monitoring server 520 may receive information on the real objects and the field users in the physical space from the field sensor system 400 or/and the computing device 100 of the field user, and update the received information to the field twin model in real time.

For example, the field monitoring server 520 receives sensor data acquired by measuring the real object from the field sensor system 400 in real time, converts the received sensor data into the virtual content, and then generates the field twin model in which the virtual content is inserted around a virtual object image of the field twin model to allow the remote manager to effectively the field situation through the generated field twin model.

Furthermore, the field monitoring server 520 receives location information and a field image for at least one field user from the field sensor system 400 in real time and generates the field twin model in which the virtual content indicating the field user is inserted into a virtual location on the field twin model corresponding to the received real-time location information of the field user to provide the remote manager to determine the location of the field user through the generated field twin model.

Furthermore, the field monitoring server 520 records and stores a work history according to the work of the field user in the virtual object corresponding to the field twin model or/and the virtual content matched to the field user, thereby monitoring the work history for the field user and the real object.

Furthermore, the field monitoring server 520 may detect, from the field sensor system 400, that the field user enters a real dangerous zone of the physical space corresponding to a predetermined dangerous zone. In this case, a notification based on the augmented reality environment may be provided to the field user computing device 100 and field user danger monitoring depending on the field twin model, the augmented reality communication, or/and the augmented reality environment may be provided to the remote manager computing devices 301: 300 and 600.

In addition, the field monitoring server 520 may include a communication facility for data relay, a computing device, etc., and provide an environment which relays the communication data to be transmitted/received between the computing devices through a wired/wireless communication network to perform the augmented reality communication between the computing devices. For example, the field monitoring server 520 may perform a role of relaying the communication data transmitted and received between the remote manager computing devices 301: 300 and 600 and the field user computing device 100.

The virtual content database 530 may store virtual content data for implementing the augmented reality environment or the mixed reality environment. The virtual content database 530 may match the virtual content to the real object (e.g., a marker) or a spatial coordinate and store the virtual content as the virtual content.

In addition, the virtual content may be stored as the virtual content by matching the virtual coordinate of the three-dimensional virtual space of the field twin model.

In addition, the virtual content database 530 may serve as a virtual content source that transfers the virtual content matched to a surrounding physical space of the computing device when the computing device makes a request.

Furthermore, the virtual content database 530 may further include a three-dimensional virtual image of modeling the virtual object constructing the field twin model and a virtual content acquired by converting field sensor data for the virtual object into information.

In addition, the field space database 540 may store information data for the physical space by scanning or three-dimensional space modeling the field physical space. Furthermore, feature information acquired by image-training the real object, the marker, etc., may be further stored in the physical space and the feature information may be stored by matching the spatial information.

That is, the server system 500 may provide the augmented reality environment through the computing device or through the on-site twin model by transmitting both the virtual content data and the spatial information data for the surrounding physical space of the computing device.

The server system 500 may include at least one computing server, a computing device, and a database server, and may include processors for processing data, and memories storing instructions for providing a communication relay service.

Field Sensor System 400

The field sensor system 400 may include various sensors that detect and measure various information (e.g., information on an environment, machine facility, and the field user) for the physical space of the field.

For example, the field sensor system 400 may include at least one of a temperature sensor, a humidity sensor, a pressure sensor, a flow sensor, a magnetic sensor, an optical sensor, an acoustic sensor, an image sensor, a current sensor, and a gas sensor.

In an embodiment, the field sensor system 400 includes a positioning sensor system 410, a camera system 420, a device sensor system 430, and a gateway 440.

The positioning sensor system 410 may detect the location information of the field user in real time.

The positioning sensor system 410 may detect the location information of the field user based on technologies including a photoelectric sensor, an ultrasonic sensor, a gate type sensor, a thermal sensor, a laser sensor, a Lidar sensor, a Wi-Fi sensor, a beacon sensor, an ultra wide band (UWB) sensor, a Bluetooth sensor, an image analysis type sensor, an RFID sensor, PDR, GPS, etc.

In an embodiment, the positioning sensor system 410 may be a UWB-based real-time positioning sensor system 410 with high precision to precisely monitor the work field or detect a detailed motion of the field user located in the dangerous zone.

In detail, the positioning sensor system 410 may include a plurality of anchors (UWB Anchors) installed in the physical space, which receives a radio signal generated from a tag (UWB Tag) possessed by the field user.

The tag of the field user may be provided in the form of a separate radio signal transmission device by the field user, but in an embodiment, it will be described as being included in the field user computing device 100.

The radio signal generated from the tag may be a UWB radio signal in which identification (ID) information and a time stamp of the field user in units of nanoseconds or milliseconds.

Since a UWB-based positioning technique is started to be standardized for commercial use in IEEE 802.15.3a and IEEE 802.15.4a, it will be described as using the standardized communication technique.

In detail, Impulse-Radio Ultra Wide Band (IR-UWB) may also transmit data at a high speed of 100 Mbps or more in the 3.1 to 10.6 GKHZ band depending on a transmission method, and has an advantage of high-precision positioning within tens of cm with low power.

A plurality of anchors arranged at predetermined intervals in the physical space may receive the radio signal of the tag and transmit positioning sensor data for determining the location (e.g., the location of the field user) of the tag to the server system 500 or directly calculate the tag location.

In an embodiment, the server system 500 may precisely calculate real-time location information (identification information and location of the field user) of the field user through positioning sensor data received the positioning sensor system 410 through at least one method of a Time Difference of Arrival (TDoA) method for calculating the location of the tag based on a radio signal reach time of the tag received from time-synchronized anchors or a Two-Way Ranging (TWR) method for calculating a Round Trip Time (RTT) and converting the calculated RTT into a distance.

The positioning sensor system 410 may have an anchor arrangement structure so that a shadow area of an anchor does not occur when an object having a predetermined size or more is located on an original layer (e.g., one layer) having a predetermined height in the physical space.

For example, referring to FIG. 2, the exemplary positioning sensor system 410 may arrange anchors at a predetermined interval on the periphery of the original layer of the physical space. In this case, the positioning sensor system 410 may include first anchors 411 arranged at an inflection point of an edge of the periphery of the original layer.

Further, the positioning sensor system 410 may include second anchors 412 arranged at equal intervals on an outermost side between the first anchors 411.

Furthermore, the positioning sensors may include a third anchor 413 arranged at a predetermined location in the original layer between the first anchor 411 and the second anchor 412.

Furthermore, the positioning sensor system may include fourth anchors 414 which are arranged at a plurality of vertical corners of the object when an object A having a predetermined size or more is located.

Furthermore, the positioning sensor system 410 may include fifth anchors 415 arranged at locations corresponding to the outer corners of the original layer facing the fourth anchors.

Through an anchor arrangement structure of the positioning sensor system 410, even when the object having the predetermined size or more is arranged in the physical space, a multi-path and/or line of sight (LoS) problem may not occur by detecting the radio signal of the tag without the shadow area.

Furthermore, the field sensor system 400 may include a camera system 420 having a plurality of cameras that acquires the field image by capturing an area of the field physical space.

The camera system 420 may include an omnidirectional camera 421 (e.g., a 360-degree camera) that captures all directions from an installed location or/and at least one remote control camera 423 (e.g., a PTZ camera) which may change a capturing area according to the control of the remote manager.

The camera system 420 may include an omnidirectional camera 421 arranged at a predetermined interval within the field and the omnidirectional camera 421 may acquire an omnidirectional field image by capturing 360 degrees at an arrangement location.

Furthermore, the camera system 420 may include the remote control camera 423 capable of remotely controlling a capturing direction and enlargement/reduction, which is arranged in the field. The remote control camera 423 may acquire a field image for the capturing direction and an enlarged/reduced capturing area automatically or according to the control of the remote manager.

The device sensor system 430 may include sensors for detecting various information of the device arranged in the field.

In detail, the device sensor system 430 may include an TOT sensor arranged in the device, and sensors for detecting the device and a surrounding environment of the device and acquire device-related information.

Sensor data acquired through the field sensor system 400 may be transmitted to the gateway 440 including at least one access point.

The gateway 440 may collect sensor data acquired from the field sensor system 400 and may serve to transmit the collected sensor data to the server system 500.

To this end, the gateway 440 may exchange data with the field sensor systems 400 through various wired/wireless communication methods.

Computing Device

In an embodiment, the computing device may include a computing device 100 (hereinafter, referred to as a "field computing device") of the field user located in the field and a computing device 301: 300 and 600 (hereinafter, it may be classified as a "remote computing device") of the remote manager.

The remote computing device 301: 300 and 600 may remotely monitor the field through the field twin model reflecting the field physical space according to the control of the installed monitoring application.

Referring to FIG. 3, as an example, the remote computing device 301: 300 and 600 may generate and output a virtual field twin model 50 corresponding to a physical space 10 of an actual field.

The field twin model 50 may display a virtual object image corresponding to a real object, and a virtual content generated based on sensor data measured from the real object is displayed around the virtual object image to perform real-time monitoring.

In addition, the field twin model 50 may display real-time location information of the field user as a virtual content (VR) based on the sensor data of the field sensor system 400 and the virtual content (VR) may further include a work history, work information, etc., input by the field user or confirmed through the sensor data.

In addition, the remote computing device 301: 300 and 600 performs augmented reality communication with the field computing device based on the field twin model 50 to provide a work instruction or a work guidance through audio and the virtual content matched to the real object.

Furthermore, the remote computing device 301: 300 and 600 may monitor that the field user enters the dangerous zone through the field twin model 50 and perform communication for a dangerous situation through augmented reality communication.

In some embodiments, the remote manager located in the field may monitor the field through the remote computing device 301: 300 and 600, but in the following description, the description is made based on a case where the remote manager is located outside the field.

The field computing device 100 may perform an augmented reality-based work assistance interface for inputting the work guide and the work history in the augmented reality environment through the virtual content matched to the real object in the physical space according to the control of the installed augmented reality application.

Furthermore, the augmented reality application of the field computing device 100 performs the augmented reality communication with the remote computing device to receive the work instruction or the work guide from the remote manager in the augmented reality environment.

In addition, the augmented reality application of the field computing device 100 may provide diversified notifications for the dangerous situation when entering the dangerous zone through the augmented reality environment.

Such a computing device may include various types of computing devices (e.g., a wearable type, a mobile type, a desktop type, or a tabletop type) in which the augmented reality application or/and a monitoring application is installed.

In the following description, the field computing device 100 will be described based on including a wearable type computing device and a mobile type computing device, and the remote computing device will be described as including a desktop type computing device and a tabletop type computing device.

However, an embodiment in which the wearable type or mobile type computing device is included in the remote computing device will also be possible.

1. Wearable Type Computing Device 100

FIG. 4 illustrates an example of experiencing an augmented reality environment through a wearable type computing device 100 according to an embodiment of the present disclosure and FIG. 5 illustrates an example of an internal block diagram of a wearable type computing device 100 according to an embodiment of the present disclosure.

The computing device 100 according to an embodiment may include a wearable type computing device 100 such as a smart glasses display or a head mounted display (HMD).

A smart glass type computing device 101 may include a display system including glasses displaying the virtual content (e.g., virtual object image) on a view field of a user while transmitting light so as for the user to view the surrounding physical space while being worn.

In detail, the computing device 101 according to an embodiment may include a transparent glass display that transmits the light from the surrounding physical space to reach eyes of the user and reflects the virtual content displayed by the display system toward the eyes of the user.

For example, referring to FIG. 4, an augmented reality application 111 of the computing device 101 may perform image recognition for a real object RO and a marker MK in the real object in the surrounding physical space 10 and control a virtual content VC1 to be displayed on the view field of the user corresponding to the recognized marker MK.

Furthermore, the augmented reality application 111 may recognize the trained real object and control a virtual content VC2 to be displayed on the view field of the user corresponding to the location of the recognized real object.

In addition, the augmented reality application 111 may recognize the physical space through the trained real object or marker MK and display a virtual content matched to a specific location of the recognized space to correspond to the view field of the user.

The virtual content may include an image or a video which may be displayed at a portion of the view field of the user in the computing device. For example, the virtual content may include virtual object images that overlay various portions of the physical space. The virtual object image may be rendered as a 2D image or 3D image.

The head mounted display type computing device 101 may block the light to the surrounding physical space so that the displayed image may be viewed only by the display system. Such a head mounted display type computing device may output a 3D image by outputting different images with a parallax offset to each of the left and right eye displays in order to recognize a 3D scene.

In addition, the head mounted display type computing device 101 may also provide the augmented reality environment by outputting an image acquired by capturing the surrounding physical space and a virtual content generated based on the captured image as the 3D image.

Hereinafter, specific components will be described centering on the smart glass type computing device 101 among such wearable type devices.

Referring to FIG. 5, the computing device 101 according to an exemplary implementation may include a memory 110 including the augmented reality application 111, a processor assembly 120, a communication module 130, an interface module 140, an input system 150, a sensor system 160, and a display system 170. Furthermore, the components may be implemented to be included in a housing of the computing device 101.

The memory 110 may store the augmented reality application 111, and the augmented reality application may include a virtual content for providing the augmented reality environment, an image buffer, a location engine, a virtual content display engine, etc. That is, the memory 110 may store instructions and data which may be used to create the augmented reality environment.

In an embodiment, the augmented reality application 111 may include a communication application for performing communication based on the augmented reality environment. The communication application may include various applications, engines, data, and instructions for providing a network speed responsive augmented reality communication service.

In addition, the augmented reality application 111 may include a danger notification application that provides a notification of the dangerous situation when entering the dangerous zone based on the augmented reality environment.

Furthermore, the memory 110 may include at least one non-transitory computer-readable storage medium and a transitory computer-readable storage medium. For example, the memory 110 may be various storage devices including a ROM, a RAM, an EPROM, a flash drive, a hard drive, etc., or may include a web storage that performs a storage function of the memory 110 on the Internet.

The processor assembly 120 may include at least one processor capable of executing instructions of the augmented reality application 111 stored in the memory 110 in order to perform various works for creating the augmented reality environment.

In an embodiment, the processor assembly 120 may control the overall operation of components through the augmented reality application 111 of the memory 110 in order to provide an augmented reality work guide, augmented reality communication, and a danger notification service.

For example, the processor assembly 120 may recognize the real object from an image acquired based on the image sensor, and control the components of the computing device 101 so as to generate and display the augmented reality image in which the virtual content is matched to the recognized real object.

The processor assembly 120 may include a central processing unit (CPU) and/or a graphic processor unit (GPU). Furthermore, the processor assembly 120 may be implemented to include at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

The communication module 130 may include one or more devices for communicating with other computing devices (e.g., server system 500). The communication module 130 may communicate through a wireless network.

In detail, the communication module 130 may communicate with a computing device storing a virtual content source for implementing the augmented reality environment, and may communicate with various user input components such as a controller receiving a user input.

In an embodiment, the communication module 130 may transmit/receive communication data related to a network speed responsive augmented reality communication service with the server system 500 and/or other computing devices.

The communication module 130 may wirelessly transmit/receive data to/from at least one of a base station, an external terminal, and a random server on a mobile communication network constructed through a communication device that may perform technical standards or communication methods (e.g., Long Term Evolution (LTE), Long Term Evolution-Advanced (LTE-A), 5G New Radio (NR), or WIFI) for mobile communication or a short-range communication method.

The sensor system 160 may include various sensors such as an image sensor 161, a location sensor (IMU) 163, an audio sensor 165, a distance sensor, a proximity sensor, a contact sensor, or a tag 167.

The tag 167 may transmit a radio signal including identification information and real-time time information of the field user in units of predetermined intervals.

The tag 167 may be provided in the form of a separate radio signal transmission device by the field user, but in an embodiment, the tag 167 will be described as being included in the field user computing device.

In detail, the tag 167 may be a UWB radio signal in which identification (ID) information and a time stamp of the field user in units of nanoseconds or milliseconds.

Since a UWB-based positioning technique is started to be standardized for commercial use in IEEE 802.15.3a and IEEE 802.15.4a, it will be described as using the standardized communication technique.

In detail, Impulse-Radio Ultra Wide Band (IR-UWB) may also transmit data at a high speed of 100 Mbps or more in the 3.1 to 10.6 GKHZ band depending on a transmission method, and has an advantage of high-precision positioning within tens of cm with low power.

The image sensor 161 may capture an image and/or a video of the physical space 10 around the computing device 101.

In an embodiment, the image sensor 161 may capture and acquire an image related to the network speed responsive augmented reality communication service.

In addition, the image sensor 161 may be arranged on a front surface or/and a rear surface of the computing device 101 and acquire the image by capturing a direction side at which the image sensor 161 is arranged and capture the physical space 10 such as the work field through a camera arranged toward the outside of the computing device 101.

The image sensor 161 may include the image sensor 161 and an image processing module. In detail, the image sensor 161 may process a still image or a moving picture obtained by the image sensor (e.g., CMOS or CCD).

Furthermore, the image sensor 161 may extract required information by processing the still image or the moving picture acquired through the image sensor 161 using the image processing module and transfer the extracted information to the processor.

The image sensor 161 may be a camera assembly including at least one camera. The camera assembly may include a general camera for capturing a visible light band and may further include a special camera such as an infrared camera, a stereo camera, etc.

The IMU 163 may detect at least one or more of a motion and an acceleration of the computing device 101. For example, the IMU 163 may be constituted by a combination of various location sensors such as an accelerometer, a gyroscope, and a magnetometer. Further, the IMU 163 may recognize spatial information for the physical space 10 around the computing device 101 in link with the location communication module 130 such as the GPS of the communication module 130.

In addition, the IMU 163 may detect information for detecting and tracking a gaze direction and a head motion of the user based on the detected location and direction.

Furthermore, in some implementations, the augmented reality application 111 may determine the location and the direction of the user in the physical space 10 by using the IMU 163 and the image sensor 161 or recognize the feature or the object in the physical space 10.

The audio sensor 165 may recognize a sound around the computing device 101.

In detail, the audio sensor 165 may include a microphone capable of detecting a audio input of the user of the computing device 101.

In an embodiment, the audio sensor 165 may receive audio data of communication data to be transmitted through the augmented reality communication service from the user.

The interface module 140 may connect the computing device 101 to communicate with one or more other devices. In detail, the interface module 140 may include wired and/or wireless communication devices compatible with one or more different communication protocols.

The computing device 101 may be connected to various input/output devices through the interface module 140.

For example, the interface module 140 may be connected to an audio output device such as a headset port or a speaker to output audio.

As an example, it has been described that the audio output device is connected through the interface module 140, but an embodiment installed inside the computing device 101 may also be included.

The interface module 140 may be configured to include at least one of a wireless/wired headset port, an external charger port, a wired/wireless data port, a memory card port, a port connecting a device with an identification module, an audio input/output (I/O) port, a video input/output (I/O) port, an earphone port, a power amplifier, an RF circuit, a transceiver, and other communication circuits.

The input system 150 may detect an input (e.g., gesture, audio command, button operation, or other type of input) related to the network speed responsive augmented reality communication service.

In detail, the input system 150 may include a button, a touch sensor, and an image sensor 161 that receives a user motion input.

Furthermore, the input system 150 is connected to an external controller through the interface module 140 to receive the input of the user.

The display system 170 may include a transparent glass display that transmits the light from the surrounding physical space 10 of the computing device 101 to reach eyes of the user and reflects the virtual content displayed by the display system 170 toward the eyes of the user.

The display system 170 may include a left display 171 corresponding to the left eye of a user wearing the computing device 101 and a right display 172 corresponding to the right eye, and the left display 171 and the right display 172 outputs different images with the parallax offset as the virtual content, so that the user may recognize the virtual content as the 3D image.

In an embodiment, the display system 170 may output various information related to the network speed responsive augmented reality communication service as a graphic image.

The display may include at least one of a liquid crystal display (LCD), a thin film transistor-liquid crystal display (TFT LCD), an organic light-emitting diode (OLED), a flexible display, a 3D display, and an electronic ink (e-ink) display.

The field worker located in the physical space 10 such as the work field may perform the field work and the wearable type computing device 101 may wear and use the wearable type computing device 101.

2. Mobile Type Computing Device 200

FIG. 6 is a conceptual view of experiencing an extended reality environment through a mobile type computing device according to an embodiment of the present disclosure and FIG. 7 is an internal block diagram of a mobile type computing device according to an embodiment of the present disclosure.

In another example, a computing device 200 may be a mobile device such as a smart phone or tablet PC on which an augmented reality application 211 is installed. The mobile type computing device 200 captures the image of the surrounding physical space 10 with the image sensor and displays the image captured through the display system and the virtual content matched to the physical space 10 and displayed to provide the augmented reality environment to the user.

For example, the computing device may include a smart phone, a mobile phone, a digital broadcasting terminal, personal digital assistants (PDA), a portable multimedia player (PMP), a tablet PC, and the like.

Referring to FIG. 6, the augmented reality application 211 of the mobile type computing device 200 may capture images of the real object (RO) and the marker (MK) in the surrounding physical space 10 and display the captured image by controlling the display system. In addition, the augmented reality application 211 may control to display the virtual content VC1 at a location corresponding to the recognized marker MK. Furthermore, the augmented reality application 211 may train and recognize a specific real object and control to the virtual content VC2 on the view field of the user corresponding to the location of the recognized specific real object.

Referring to FIG. 7, the mobile type computing device 200 according to an exemplary implementation may include a memory 210, a processor assembly 220, a communication module 230, an interface module 240, an input system 250, a sensor system 260, and a display system 270. The components may be configured to be included in the housing of the computing device 200.

Redundant contents in the description of the component of the mobile type computing device 200 will be replaced with a description of the component of the wearable type computing device 101 and hereinafter, the description will be made centering on a difference from the wearable type computing device 101.

The components may be arranged in the housing of the mobile type computing device 200 and a user interface may include a touch sensor 273 on a display 271 configured to receive a touch input of the user.

In detail, the display system 270 may include the display 271 outputting the image and the touch sensor 273 detecting the touch input of the user.

As an example, the display 271 has a mutual layer structure with the touch sensor 273 or is integrally formed to be implemented as a touch screen. Such a touch screen may serve as a user input unit for providing an input interface between the computing device 200 and the user and provide an output interface between the computing device 200 and the user.

Furthermore, the sensor system 260 may include the image sensor 261 and as an example, the image sensor 261 may be arranged on one surface and the other surface of the housing of the computing device 200.

In this case, the image sensor on one surface is oriented toward the physical space 10 to capture an image acquired by capturing the physical space 10 and the image sensor on the other surface is oriented toward the user to capture the view field, the gesture, etc., of the user.

The mobile type computing device 200 may be suitable for the field worker located in the physical space 10 such as the work field.

3. Desktop Type Computing Device 300

FIG. 8 illustrates an example of providing a field twin model through a desktop type computing device according to an embodiment of the present disclosure and FIG. 9 illustrates an example of an internal block diagram of a desktop type computing device according to an embodiment of the present disclosure.

Redundant contents in the description of the component of the desktop type computing device will be replaced with a description of the component of the wearable type computing device 101 and hereinafter, the description will be made centering on a difference from the wearable type computing device 101.

In the desktop type computing device, a monitoring application for monitoring the field based on the field twin model 50 may be installed.

Referring to FIG. 8, the monitoring application of the desktop type computing device 300 may control a display device 370 to output the virtual field twin model 50 corresponding to the physical space, and the virtual content (VR) may be displayed in the field twin model.

The field twin model 50 may display a virtual object image corresponding to a real object, and a virtual content generated based on sensor data measured from the real object is displayed around the virtual object image to perform real-time monitoring.

In addition, the monitoring application of the desktop type computing device 300 provides an interface for generating the virtual content corresponding to the physical space of the field based on the field twin model 50, the field image or/and the capturing image of the field user and the virtual content generated as such may be generated and displayed at the location corresponding to the physical space.

Referring to FIG. 9, in another example, the computing device 300 may further include devices in which a program for executing the network speed responsive augmented reality communication service based on wired/wireless communication, such as personal computers is installed, which include a fixed desktop PC, a laptop computer, and an ultrabook in which a monitoring application 311 is installed.

The desktop type computing device 300 receives an image acquired by capturing the surrounding physical space in the computing device 300 of the other user, and augments and displays the received image and the virtual content matched to the physical space to provide the augmented reality environment to the user.

Furthermore, the desktop type computing device 300 includes a user interface system 350 to receive a user input (e.g., a touch input, a mouse input, a keyboard input, a gesture input, a motion input using a guide tool, etc.).

As an example, in the computing device 300, the user interface system 350 is connected to at least one device of a mouse 351, a keyboard 352, a gesture input controller, an image sensor 361 (e.g., a camera), and an audio sensor 365 by various communication protocols to acquire the user input.

In addition, the desktop type computing device 300 may be connected to an external output device through the user interface system 350, and may be connected to, for example, a display device 370 or an audio output device.

As an exemplary implementation, the monitoring application 311 of the desktop computing device 300 may acquire and output an image of the computing device 300 of the other user through the display device 370, and receive the user input corresponding to the image or the field twin model 50 and generate the virtual content corresponding to the image or the field twin model according to the received user input.

Furthermore, the monitoring application 311 may receive data from the sensor system 260 in the physical space of the image or a pre-matched virtual content source and generate the received data as the virtual content matched to the image.

Furthermore, the monitoring application 311 overlays the virtual content generated as such to the captured image, the field image, or the field twin model 50 output from the display device to provide the augmented reality environment to the user.

In addition, the monitoring application 311 transmits the virtual content generated through the communication module 330 as communication data to utilize the virtual content corresponding to the physical space 10 as well as the audio and the image as a medium for communication.

The desktop type computing device 300 according to an exemplary implementation may include a memory 310, a processor assembly 320, a communication module 330, a user interface system 350, and an input system 340. The components may be configured to be included in the housing of the computing device 300.

Redundant contents in the description of the component of the desktop type computing device 300 will be replaced with the description of the component of the wearable type computing device 300.

Such a desktop type computing device 300 may be advantageous for use by the remote manager who transfers instructions or required information remotely in link with the computing device 300 of the field worker.

4. Tabletop Type Computing Device 600

According to an exemplary implementation, the tabletop type computing device 600 may be implemented in a tabletop shape having a new shape and structure different from the existing desktop type computing device 300, and in this case, the tabletop type computing device 600 may provide an input/output interface based on the augmented reality environment through the system included in the table top.

Redundant contents in the description of the component of the tabletop type computing device 600 will be replaced with a description of the component of the desktop type computing device 300 and hereinafter, the description will be made centering on a difference from the desktop type computing device 300.

FIG. 10 illustrates an example of experiencing extended reality communication through a tabletop type computing device according to an embodiment of the present disclosure and FIG. 11 illustrates an example of an internal block diagram of a tabletop type computing device according to an embodiment of the present disclosure.

The tabletop type computing device 600 may be a device that provides an input/output interface which allows the remote manager to easily check the image received from the computing device 100 of the field worker and easily input the work guidance for the object displayed in the corresponding image based on the virtual content.

In addition, the tabletop type computing device 600 may be a device that provides an input/output interface system that allows the remote manager to easily input the work guidance for the object image displayed on the field twin model 50 based on the virtual content.

That is, the tabletop type computing device 600 may be a system that generates and provides the augmented/mixed reality image of displaying the virtual content generated based on the real object of the image acquired at a current location on the image acquired from the computing device of the other user.

Referring to FIGS. 10 and 11, the exemplary tabletop type computing device 600 may include a memory 610, a processor assembly 620, a communication module 630, an interface module 640, an input system 650, a sensor system 660, and a display system 670.

The components may be configured to be included in the housing of the computing device 600. Redundant contents in the description of the component of the tabletop type computing device 600 will be replaced with the description of the described component and hereinafter, the description will be made centering on a difference.

Referring to FIG. 10, the exemplary tabletop type computing device 600 outputs a captured image (or field twin model 50) captured by the other computing device through the display system 670 and the virtual content associated with the captured image (or field twin model 50) to provide the augmented reality environment to the user.

Furthermore, the tabletop type computing device 600 may provide an input/output interface that receives a touch input such as pointing, drag, etc., of the user for the captured image (or field twin model 50) through a touch sensor 673 on a display 671 of the display system 670.

Furthermore, the tabletop type computing device 600 may receive a gesture input of a hand (LH or RH) of the user through the sensor system 660 (e.g., image sensor 661) arranged on the display system 670 and receive an operation input according to a guide tool (GT). The gesture input and the operation input of the guide tool may also be input into the display 671 in response to the captured image (or field twin model 50) and the computing device 600 may detect the user input by matching the real object image displayed in the captured image (or field twin model 50).

That is, a monitoring application 611 of the tabletop type computing device 600 according to an embodiment may execute a series of processes for implementing a service for visualizing and providing the virtual content based on the user input acquired through the sensor system 660. In this case, since the user input is performed in response to the captured image (or field twin model 50) displayed on the display, the input/output interface is together provided, and as a result, the user may more intuitively perform the user input for the captured image (or field twin model 50).

<Method for Monitoring Field Based on Augmented Reality Using Digital Twin>

Hereinafter, a method for monitoring the field based on the field twin model 50 by the monitoring application 311 or 611 of a computing device (hereinafter, referred to as a remote computing device 301) of the remote manager will be described in detail with reference to FIGS. 12 to 15.

Here, the monitoring application 311 or 611 is the monitoring application 311 of the desktop type computing device 300 and/or the monitoring application 611 of the tabletop type computing device 600, which is one of the remote computing devices 301.

The monitoring application 311 or 611 of the remote computing device 300 may control to output the field twin model 50 capable of monitoring the field (S101).

The monitoring application 311 or 611 may perform a process which models a virtual three-dimensional field twin model 50 based on data obtained by three-dimensional scanning of the physical space in the field and reflects information on the real object or field user in the physical space of the field on the modeled field twin model 50 in real time.

In detail, the monitoring application 311 or 611 may generate the field twin model 50 corresponding to the physical space 10 of the field in the virtual three-dimensional space based on the data acquired by three-dimensional scanning of the physical space 10 of the field and provide the input/output interface based on the generated field twin model 50 to the remote manager by controlling the user interface system.

For example, the monitoring application 311 or 611 may generate the field twin model acquired by three-dimensional modeling of the virtual objects corresponding to the real objects of the physical space in the three-dimensional virtual space based on the image obtained by capturing the physical space 10 of the field by the field sensor system 400 and spatial information (e.g., depth data of the real object) that scans the locations of the real objects located in the physical space 10.

These monitoring application 311 or 611 may receive the user input of the remote manager and provide the input/output interface that generates and changes the field twin model 50 based on the user input through the display device 370 or 670 by controlling the user interface system.

Furthermore, the monitoring application 311 or 611 may receive related information of the real object of the physical space 10 or/and information (e.g., location, work history information, etc.) on the field users from the field sensor system 400, the field user computing device, or/and the server system 500 and control to update the information to the field twin model 50 and output the updated information as the virtual content.

In an embodiment, the method will be described based on a case where the field monitoring server 520 of the server system 500 is connected to the field sensor system 400 and the computing device 100 of the field user to receive the sensor data and the communication data and transmit the received sensor data and communication data to the remote computing device 301.

The field monitoring server 520 may transmit location information and a field image of at least one field user from the field sensor system 400 to the remote computing device 301 in real time. The monitoring application 311 or 611 receiving the location information and the field image may calculate the received real-time location information of the field user and control to output the field twin model 50 that overlays the virtual content (e.g., icon) indicating the field user at the virtual location to the field twin model 50 corresponding to the calculated location information of the field user.

That is, the monitoring application 311 or 611 controls to insert the virtual content corresponding to the real object and the field user information into the virtual three-dimensional field twin model 50 corresponding to the field and output the inserted virtual content to remotely manage and monitor the field at a glance.

Referring to FIG. 13, an exemplary field twin model 50 may include 3D virtual object images representing virtual objects corresponding to real objects in the field.

In addition, the field twin model 50 may acquire information on the real objects from the field sensor system 400 or/and the field computing device 100, and display a first virtual content (VR10) representing the acquired real object information according to selection of the remote manager adjacent to the virtual object image corresponding to the real object.

In addition, the field twin model 50 may match the field user location information generated based on the sensor data acquired by the positioning sensor system 410 to the location of the virtual space in the field twin model 50 and display the field user location information as a second virtual content (VR20) and provide the field user location information so as to accurately determine the location of the field user.

In addition, the field twin model 50 may display a third virtual content (VR21) including detailed information (e.g., identification information, work information, work history information, communication connection icon, etc.) on the field user selected according to the selection of the remote manager to be adjacent to or included in the second virtual content (VR20).

As such, the monitoring application 311 or 611 may generate and provide a field twin model that updates the real object information and the field user information to the virtual space matched to the actual field physical space 10 in real time and provide a monitoring function to monitor an overall field and check respective detailed information by the remote manager.

Furthermore, the monitoring application 311 or 611 may perform augmented reality communication with the field user (S103).

The augmented reality communication means an activity in which different users give and receive the communication data for mutual communication through the computing device based on realistic media (e.g., video and audio) including the virtual content corresponding to the physical space 10 of the field.

That is, the communication system according to an embodiment may support multi-party communication within the augmented reality environment by additionally communicating a virtual content associated with the field twin model 50 along with the audio and the video, which are communication media of general communication. Here, since the virtual content associated with the field twin model 50 may be matched to the coordinates of the virtual space of the field twin model 50, and the virtual space is matched to the coordinates to the physical space 10 of the actual field, it may be regarded that the virtual content is matched to the actual coordinates of the physical space 10.

The communication data may include audio, video, and/or virtual contents which computing devices of different users (e.g., the remote manager and the filed worker) give and receive through the network. In an embodiment, the communication data may be transmitted/received based on the network by the computing device and/or the server system 500.

In detail, the monitoring application 311 or 611 may perform the augmented reality communication with the field computing device 100 based on the field twin model 50.

In more detail, the monitoring application 311 or 611 may select the field user according to the input of the remote manager based on the field twin model 50 and perform the augmented reality communication after acceptance of the computing device 100 of the selected field user.

For example, when the monitoring application 311 or 611 receives the user input of selecting the virtual content representing the field user in the field twin model 50, the monitoring application 311 or 611 extracts the identification information of the selected field user to request the augmented reality communication to the computing device 100 of the field user corresponding to the identification information.

When the augmented reality communication is started by the acceptance of the field user, the monitoring application 311 or 611 may provide the field twin model 50 capable of constructing the augmented reality environment for the field user or captured image based augmented reality communication to the remote manager.

In detail, the monitoring application 311 or 611 may provide, to the user, an interface that generates the work instruction or the work guidance as the virtual content corresponding to the virtual space (or virtual object) according to the user input based on the field twin model 50.

For example, the monitoring application 311 or 611 may receive an input for selecting the location or/and the virtual object of the virtual space according to the user input such as a pointing input, a drawing input, etc., for the field twin model 50.

In addition, the monitoring application 311 or 611 may match a selection input for the virtual space of the field twin model 50 to the physical space 10 of the actual field and appreciate the selection input as an input for a location for the real physical space 10 or/and the real object.

Furthermore, the monitoring application 311 or 611 may associate the work instruction or work guidance according to the user input with the location and real object, and generate the work instruction or work guidance as the virtual content and transmit the virtual content to the computing device 100 of the field user.

Here, the work instruction means a document created according to the user input through an input interface such as a text.

Furthermore, the work guidance may include a manual for a previously generated work, a virtual image generated by the drawing input for the captured image, or a virtual image for navigating a specific location.

When the field user computing device receives the work related virtual content associated with the location or the real object of the physical space 10, the augmented reality image into which the virtual content may be displayed in response to the location or the real object of the physical space 10 around the field user.

Referring to FIG. 14, the monitoring application 311 or 611 may control the field twin model 50 to be output from the display device 370 or 670, and a virtual content representing a real-time field user may be displayed in the field twin model 50. The field twin model 50 may provide an input/output interface that selects the field computing device 100 which intends to perform the augmented reality communication according to a user input for selecting the virtual content representing the field user or a user input for searching and selecting an identification ID 70 of the field user.

In addition, it is possible to provide a virtual content input interface through the augmented reality communication based on the field twin model 50. In detail, the monitoring application 311 or 611 may provide an interface window 60 for inputting the work guidance or work instruction to be sent to the connected field user and generating the virtual content and an input/output interface for associating the work instruction or work guidance input through the interface window 60 with the location of the virtual space selected in the field twin model 50.

Furthermore, the monitoring application 311 or 611 matches the location of the selected virtual space to spatial coordinates of the actual field and then, match the generated virtual content through the interface window, and transmit the virtual content to the computing device 100 of the field user to provide the augmented reality communication interface based on the field twin model 50.

In addition, the monitoring application 311 or 611 may designate a virtual content which is a manual generated by matching with the real object as the virtual object through the field twin model 50 and transmit the virtual content to the field user.

As such, the monitoring application 311 or 611 may provide the work instruction or/and the work guidance by rapidly selecting a field user around a location which the monitoring application 311 or 611 intends to give the work instruction based on the field twin model 50 and provide an input/output interface capable of intuitively generating a virtual content in which the provided work instruction or work guidance is matched to the location or the real object of the physical space 10.

Further, the monitoring application 311 may provide an augmented reality content creation interface based on the field twin model for generating the work guidance which is a virtual content for implementing the augmented reality image in the field user computing device.

In detail, the monitoring application 311 may select the virtual object through the output field twin model and extract a captured image or a field image for the selected virtual object. For example, when the monitoring application 311 detects the real object corresponding to the virtual object through the marker or the like in the field user computing device, the monitoring application 311 may provide an AR creation interface for receiving a captured image of the real object in the field user computing device and generating a virtual work manual that overlays a virtual content for adding a work description onto the received captured image.

In addition, the monitoring application 311 or 611 may provide an input/output interface for checking and managing the work history of the field user based on the field twin model 50 (S105).

When the monitoring application 311 or 611 detects the work history of the field user from a real object (e.g., machine facility) of the field based on the field sensor system 400, the monitoring application 311 or 611 may store the detected work history information as a work history for the virtual object matched to the real object and the field user.

For example, the monitoring application 311 or 611 may receive the work history information input by the field user from the field computing device 100.

The monitoring application 311 or 611 that receives the work history information may store the work history information by matching the location of field twin model 50 or the virtual object corresponding to the location of the field user or the real object selected by the field user.

In addition, the monitoring application 311 or 611 may detect the execution of the task on the real object through the field sensor system 400.

In detail, the monitoring application 311 or 611 may detect the field user adjacent to the real object through the sensor data of the field sensor system 400 and detect a work process through the field image acquired by capturing the field user and the real object.

In addition, the monitoring application 311 or 611 detects changes in device information (e.g., flow rate, pressure, temperature, etc.) from the device sensor system 430 to detect the work process of the real object of the field user.

In addition, the monitoring application 311 or 611 analyzes data on the detected work process to extract the work history information for the real object.

In detail, the monitoring application 311 or 611 generates the detected work process as the work history information including the text and stores the generated work history information by matching the generated work history information to the virtual object of the field twin model 50 for the real object to automatically store the work history information for the real object by matching the work history information to the virtual object of the field twin model 50.

Thereafter, the monitoring application 311 or 611 may execute a work history check and management function according to the input of the remote manager, and display the work history information matched to the virtual object of the field twin model 50 or the work history information matched to the field user and make the user check the work history information.

In detail, when the remote manager selects the virtual content representing the field user located in the field twin model 50, the monitoring application 311 or 611 may display the work history information performed by the field user as another virtual content next to the virtual content of the field user.

In addition, when a specific virtual object of the field twin model 50 is selected, the monitoring application 311 or 611 may display the work history information stored in the selected virtual object and identification information of the field user who performs the work history information as the virtual content around the selected virtual object.

As such, the monitoring application 311 or 611 may provide an interface capable of storing and managing, and checking the work history information for the field user and the real object based on the field twin model 50 to the remote manager.

Meanwhile, the monitoring application 311 or 611 may detect that the field user enters a real dangerous zone of the physical space corresponding to a predetermined dangerous zone (S107).

In detail, the monitoring application 311 or 611 synchronizes the location of the field user with the field twin model 50 in real time based on the positioning sensor system 410, thereby locating the field user by matching the location of the field user with the field twin model 50.

Further, in the field twin model 50, the dangerous zone may be set. In detail, in the field twin model 50, at least one dangerous zone may be set in the field twin model 50 by designating the periphery of the machine facility or a fall risk area which may cause physical damage in the physical space 10 of the field as a predetermined space in the virtual space of the field twin model 50.

For example, the monitoring application 311 or 611 provide an interface for setting the danger zone by receiving a user location designation input for a three-dimensional space of the field twin model 50 to set the dangerous zone in the field twin model 50.

In addition, the monitoring application 311 or 611 may designate or release the dangerous zone in the field twin model 50 according to device sensor data. For example, when a temperature of the real object in the device sensor data is higher than or equal to a preset first temperature, the monitoring application 311 or 611 may automatically set the periphery of the device as the danger zone and when the temperature of the real object is equal to or lower than a preset second temperature, the monitoring application 311 or 611 may cancel the setting of the dangerous zone.

In addition, the monitoring application 311 or 611 may additionally designate a dangerous area in the dangerous zone of the field twin model 50. For example, the monitoring application 311 or 611 may set the dangerous area in the dangerous zone that may cause the physical damage in the machine facility when designating the periphery of a dangerous machine facility as the dangerous zone.

That is, in the field twin model 50, the periphery of the dangerous area may be set as the dangerous zone and the dangerous area may be set in the dangerous zone.

Since the dangerous zone is set in response to three-dimensional spatial coordinates in the field twin model 50 corresponding to the field physical space 10 and the location of the field user is also synchronized with the field twin model 50 in real time, the monitoring application 311 or 611 may detect that the field user enters the set dangerous zone based on the field twin model 50.

In detail, when the monitoring application 311 or 611 detects that the location of the field user enters the 3D spatial coordinates set as the dangerous zone through the positioning sensor data, the monitoring application 311 or 611 may detect that the field user enters the dangerous zone of the actual physical space 10.

The monitoring application 311 or 611 that detects that the field user enters the dangerous zone may remotely monitor the dangerous situation of the field user (S109).

1) The monitoring application 311 or 611 may highlight the virtual content representing the location of the field user entering a real dangerous zone of the physical space corresponding to the dangerous zone in the field twin model 50 and notify the remote manager of the entrance of the field user into the dangerous area.

2) Furthermore, the monitoring application 311 or 611 receives the captured image from the computing device 100 of the field user who enters the dangerous zone in real time and displays the received captured image inside or outside the field twin model 50 to provide the dangerous situation of the field user to be continuously monitored in more detail.

In addition, the monitoring application 311 or 611 receives, from the camera system 420 of the field, a captured image acquired by capturing an area including the dangerous zone (or dangerous area) and the field user designated in the field twin model 50 and displays the captured image inside or outside the field twin model 50 to monitor the dangerous situation of the field user in an external viewpoint.

For example, the monitoring application 311 or 611 separates an area for capturing the field user and the dangerous zone (e.g., dangerous area in the dangerous zone) from the field image captured by an omnidirectional camera 421 of the camera system 420 to provide the dangerous situation to be monitored in the external viewpoint.

Further, the monitoring application 311 or 611 controls the remote control camera 423 to control to change the capturing direction so as to capture the field user and the dangerous zone and the field image acquired by capturing both the field user and the dangerous zone through enlargement or reduction.

The monitoring application 311 or 611 may display the captured field image of the external viewpoint around the field twin model 50 and in this case, the virtual content for highlighting the dangerous area set in the field twin model 50 is displayed in the field image by matching the dangerous area to provide the dangerous situation to be monitored based on the augmented reality environment.

3) The monitoring application 311 or 611 may perform the augmented reality communication with the field user who enters a real dangerous zone of the physical space corresponding to the dangerous zone in the field twin model.

When detecting the entrance into the dangerous zone, the monitoring application 311 or 611 may automatically perform the augmented reality communication with the computing device 100 of the field user. In this case, a communication request step with the field user and an acceptance step may be omitted and the augmented reality communication may be automatically performed.

That is, the remote manager that checks the location of the field user and the location of the dangerous area based on the field twin model 50 and is monitoring the work situation in the dangerous zone of the field user at various viewpoints through the field image or/and the captured image may transfer a feedback for the work to the field user through the augmented reality communication in real time.

Here, the augmented reality communication is a communication method for remotely performing the communication through the video, the audio, and the virtual content matched to the physical space 10 and the remote manager may efficiently provide a warning for the dangerous area and the work guide in the dangerous zone.

Therefore, in the monitoring application 311 or 611, the remote manager monitors the work in the dangerous zone and provides the audio or/and the virtual content to the field user through the real-time augmented reality communication to allow a safe work in the dangerous zone to be performed.

In detail, referring to FIG. 15, the monitoring application 311 or 611 may detect that the field user enters a dangerous zone DZ which is the periphery of a dangerous real object A through the positioning sensor system 410. Here, the periphery of the dangerous real object may be matched to the three-dimensional virtual space coordinates in the field twin model 50 and set as a virtual dangerous zone DZ and the periphery of the dangerous real object is matched to the virtual location coordinates of the field user synchronized with the field twin model 50 in real time, and as a result, the field user may detect that the field user enters the dangerous zone DZ.

Furthermore, the monitoring application 311 or 611 may designate an area where both the dangerous area and the field user may be captured based on the location of the field twin model 50, and acquire and output the captured image acquired by capturing the dangerous area and the field user by controlling the camera system 420.

In addition, the monitoring application 311 or 611 may receive the captured image captured by the field user and display the captured image by matching the field twin model 50.

As such, the monitoring application 311 or 611 provides multilateral monitoring and augmented reality communication when the field user performs the work in the dangerous zone DZ based on the field twin model 50 to derive the safe work.

<Method for Supporting Work of Field User Through Field Monitoring System>

FIG. 16 illustrates an example of a method for assisting a work based on an augmented reality environment to a field user through a field monitoring system according to an embodiment of the present disclosure and FIG. 17 illustrates an example of a concept of providing a notification of a dangerous zone based on an augmented reality environment to a field user located in a dangerous zone according to an embodiment of the present disclosure.

The computing device 100 (hereinafter, referred to as field computing device 100) of the field user located in the field for the field twin model 50 may support the work so as for the field user to effectively receive the work instruction and perform the work by being supported by the field monitoring system.

Hereinafter, the field computing device 100 is described based on a case where the field computing device 100 is the smart glass type.

Referring to FIG. 16, the augmented reality application 111 (hereinafter, referred to augmented reality application 111) of the field computing device 100 may perform the augmented reality communication with the computing device of the remote manager (S201).

The augmented reality application 111 may receive the virtual content matched to the three-dimensional virtual coordinates of the field twin model 50 from the remote manager.

Here, the augmented reality application may mean the augmented reality application 211 of FIG. 6.

In addition, in the augmented reality application 111, the received virtual content is matched to actual coordinates of the field physical space 10 matched to the three-dimensional virtual coordinates and then, the three-dimensional virtual coordinates are augmented (e.g., inserted) into the actual coordinates and displayed to intuitively check the work instruction or guidance of the remote manager through the augmented reality communication.

Further, the augmented reality application 111 outputs the work guidance of the remote manager based on the field win model 50 as the virtual content matched to the physical space 10 to display the work guidance of the remote manager as the virtual content.

In detail, the augmented reality application 111 may receive device-related information stored for a virtual object (e.g., virtual facility) of the field twin model 50 from the remote manager and the device-related information may be output as the virtual content (e.g., augmented reality image) matched to the real object expressed by the virtual object.

In addition, the augmented reality application 111 may receive the work instruction issued by the remote manager through the field twin model 50, and when the work instruction is matched to the three-dimensional virtual space coordinates of the field twin model 50, the work instruction is output to the coordinates of the field physical space 10 corresponding to the three-dimensional virtual space coordinates, thereby displaying the work instruction in the augmented reality environment.

Furthermore, the augmented reality application 111 may provide a work history interface for generating and storing the work history information on the augmented reality, based on the augmented reality (S205).

In detail, the augmented reality application 111 may execute a work history interface when there is the user input from the field user.

In addition, the augmented reality application 111 may provide a work input window in which the text, a work performance log, etc., may be entered as the augmented reality virtual content and store information input into the work input window as work input information.

In this case, the augmented reality application 111 may input and store the work input information by matching a surrounding real object (e.g., a machine that performs the work). The work input information input as such may be stored as the work history for the virtual object of the field twin model 50 matched to the real object, and matched to the identification information of the field user and stored in the field twin model 50.

Furthermore, the augmented reality application 111 may detect that the field user enters the dangerous zone DZ (S207).

In detail, the augmented reality application 111 controls the tag and transmits a UWB radio signal to recognize the location of the field user in the field twin model 50.

When the location of the field user in the dangerous zone DZ of the field twin model 50 is detected, the augmented reality application 111 may detect that the field user enters the dangerous zone DZ by receiving a notification that the field user enters the dangerous zone DZ from the remote manager or/and the server system 500.

When detecting the entry into the dangerous zone DZ, the augmented reality application 111 may output a danger notification in the augmented reality environment (S209).

The augmented reality application 111 receives location information for the dangerous area in the dangerous zone DZ and provides the virtual content corresponding to the location information in the augmented reality environment to notify the actual location of the dangerous area in detail.

In detail, the augmented reality application 111 may receive the three-dimensional spatial coordinates of the dangerous zone DZ set in the field twin model 50.

In addition, the augmented reality application 111 may convert the virtual 3D spatial coordinates into the actual spatial coordinates of the physical space 10 in the field to acquire the 3D actual coordinates for the dangerous area of the physical space 10.

Next, the augmented reality application 111 may control the display system to output a virtual content indicating the danger notification in an area corresponding to the acquired actual coordinates.

For example, referring to FIG. 17, when viewing an actual space including the dangerous area through the wearable type computing device 100, an augmented reality environment to which a red translucent 30-th virtual image (VR30) indicating that there is a risk of electric shock in the area corresponding to the actual coordinates for the dangerous area in the actual space is overlaid may be provided to the field user.

In addition, an augmented reality environment in which a 40-th virtual content (VR40) indicating the work guidance is overlaid around a real object that needs to perform the work may be provided to the field user.

In addition, a menu for performing various interfaces related to the augmented reality application 111 may be displayed at the top of the field user's field of view, and additional virtual contents may be overlaid and displayed around the related real object according to the field user's selection.

In addition, the augmented reality application 111 may detect that the body of the field user approaches the dangerous area within a predetermined distance, based on the field image, the captured image, or/and the positioning sensor data on the captured image.

In addition, the augmented reality application 111 may provide a notification to the device of the field user when detecting the access to the dangerous area of the field user, and may also output an additional warning notification to the remote manager.

At this time, in order to detect the access to the dangerous area, the augmented reality application 111 may additionally utilize the field image and the posture and location information acquired from the sensor system.

In detail, the augmented reality application 111 tracks 6 degrees of freedom of the field computing device 100, and based on the relative positional relationship between the field computing device 100 and the hand, it is possible to track 6 degrees of freedom of the hands of the field user according to a change in 6 degrees of freedom of the field computing device 100.

When the tracked hand location approaches the dangerous area within a predetermined distance, the augmented reality application 111 outputs audio and visual virtual contents notifying that the hand is dangerous, thereby ensuring the safety of the user.

The operations according to the embodiments described above are implemented in a form of a program command which may be executed through various computer components means and may be recorded in the computer readable recording medium. The computer readable recording medium may include singly a program command, a data file, or a data structure or a combination thereof. The program command recorded in the computer readable recording medium may be specially designed and configured for the present disclosure, or may be publicly known to and used by those skilled in the computer software field. Examples of the computer readable recording media may include a hardware device particularly configured to store and execute program commands, magnetic media such as hard disks, floppy disks, and magnetic tape, optical recording media such as CD-ROM disks and DVD, magneto-optical media such as floptical disks, ROM, RAM, and flash memories. Examples of the program commands include a high-level language code executable by a computer by using an interpreter, and the like, as well as a machine language code created by a compiler. The hardware devices may be changed to one or more software modules in order to perform the processing according to the present disclosure, and an opposite situation thereof is available.

Specific executions described in the present disclosure are exemplary embodiments and the scope of the present disclosure is not limited even by any method. For brevity of the specification, descriptions of conventional electronic configurations, control systems, software, and other functional aspects of the systems may be omitted. Further, connection or connection members of lines among components exemplarily represent functions connections and/or physical or circuitry connections and may be represented as various functional connections, physical connections, or circuitry connections which are replaceable or added in an actual device. Further, unless otherwise specified, such as "essential", "important", etc., the connections may not be components particularly required for application of the present disclosure.

Further, in the detailed description of the present disclosure, which is described, while the present disclosure has been described with respect to the preferred embodiments, it will be understood by those skilled in the art or those skilled in the art having ordinary knowledge in the technical field that various changes and modifications of the present disclosure may be made without departing from the spirit and the technical scope of the invention disclosed in the following claims. Therefore, the technical scope of the present disclosure should not be limited to the contents described in the detailed description of the specification but should be defined by the claims.

In a system and a method for monitoring a field based on augmented reality using a digital twin according to an embodiment of the present disclosure, a remote manager can monitor a field situation and a work status of a worker from accurate and various viewpoints through a digital twin.

Furthermore, in a system and a method for monitoring a field based on augmented reality using a digital twin according to an embodiment of the present disclosure, a work instruction and a work guide which match a physical space can be transferred to a field user by using a field twin model.

In a system and a method for monitoring a field based on augmented reality using a digital twin according to an embodiment of the present disclosure, a field worker provides the work instruction or work guide from a remote manager monitoring by the digital twin in an augmented reality environment, thereby enabling an efficient instruction and guide for a work.

In a system and a method for monitoring a field based on augmented reality using a digital twin according to an embodiment of the present disclosure, when the field worker enters a dangerous zone, an alarm based on the digital twin and the augmented reality environment is provided in various methods to enhance a stability of the work.

What is claimed is:
1. A method for monitoring a field based on augmented reality using a digital twin performed in a processor of a computing device of a manager located remotely from a physical space of a field, the method comprising:
outputting a field twin model of a three-dimensional virtual space matched to the physical space of the field;

acquiring location information of a field user for the physical space based on positioning sensor data received from a field sensor system arranged in the field;

displaying a first virtual content representing a location of the field user on the field twin model by matching location information of the field user for the physical space to the three-dimensional virtual space;

requesting augmented reality communication connection with a computing device of the field user through the first virtual content;

performing augmented reality communication with the computing device of the field user according to acceptance of the field user; and providing an input/output interface for generating a particular virtual content matched to one location of the three-dimensional virtual space based on the field twin model and transmitting the generated particular virtual content as communication data.

2. The method of claim 1,
wherein the step of acquiring the location information of the field user for the physical space based on the positioning sensor data further comprises, acquiring the positioning sensor data acquired by receiving an ultra wide band (UWB) radio signal generated from a tag of the field user by a plurality anchors;

tracking real-time actual coordinates of the physical space for the field user based on the acquired positioning sensor data;

calculating virtual coordinates of the three-dimensional virtual space matched to the actual coordinates; and displaying the first virtual content representing identification information of the field user on the calculated virtual coordinates.

3. The method of claim 1, further comprising:
receiving information about a real object arranged in the physical space of the field from the field sensor system arranged in the field; and overlaying and displaying the received information about the real object on a virtual object matched to the real object of the field twin model.

4. The method of claim 1, further comprising:
receiving work history information matched to a real object through the computing device of the field user;

storing the received work history information;

matching the received work history information to a virtual object corresponding to the real object; and displaying a work history virtual content representing the work history information around the virtual object of the field twin model.

5. The method of claim 1, further comprising:
detecting that the field user enters a real dangerous zone of the physical space corresponding to a predetermined dangerous zone of the field twin model; and monitoring the field user in the real dangerous zone by the field twin model and a field image received through a camera system arranged in the field.

6. The method of claim 5, further comprising:
transmitting, to a computing device of the field user, coordinates of the three-dimensional virtual space for the predetermined dangerous zone in the field twin model; and overlaying and displaying a work history virtual content for highlighting a dangerous area on actual coordinates of the physical space matched to coordinate information of the three-dimensional virtual space in the computing device of the field user.

* * * * *